United States Patent
Bernardini et al.

(10) Patent No.: US 8,660,878 B2
(45) Date of Patent: Feb. 25, 2014

(54) MODEL-DRIVEN ASSIGNMENT OF WORK TO A SOFTWARE FACTORY

(75) Inventors: Fausto Bernardini, New York, NY (US); Jarir K. Chaar, Tarrytown, NY (US); Yi-Min Chee, Yorktown Heights, NY (US); Krishna C. Ratakonda, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/160,734

(22) Filed: Jun. 15, 2011

(65) Prior Publication Data

US 2012/0323624 A1    Dec. 20, 2012

(51) Int. Cl.
*G06Q 10/00* (2012.01)

(52) U.S. Cl.
USPC ....... 705/7.16; 705/7.12; 705/7.13; 705/7.15; 705/7.17; 705/7.22; 700/105; 700/108; 700/109; 717/101; 717/102

(58) Field of Classification Search
USPC ................ 705/7.12, 7.13, 7.15–7.17, 7.22; 717/101, 102; 700/108, 105, 109
See application file for complete search history.

(56) References Cited

U.S. PATENT DOCUMENTS

| | | |
|---|---|---|
| 5,548,506 A | 8/1996 | Srinivasan |
| 5,550,971 A | 8/1996 | Brunner et al. |
| 5,729,749 A | 3/1998 | Ito |
| 5,835,898 A | 11/1998 | Borg et al. |
| 5,953,533 A | 9/1999 | Fink et al. |
| 5,974,392 A | 10/1999 | Endo |
| 6,049,775 A | 4/2000 | Gertner et al. |
| 6,226,784 B1 | 5/2001 | Holmes et al. |
| 6,237,020 B1 | 5/2001 | Leymann et al. |
| 6,286,104 B1 | 9/2001 | Buhle et al. |
| 6,405,364 B1 | 6/2002 | Bowman-Amuah |
| 6,487,469 B1 | 11/2002 | Formenti |
| 6,516,451 B1 | 2/2003 | Patin |
| 6,519,763 B1 | 2/2003 | Kaufer et al. |
| 6,550,057 B1 | 4/2003 | Bowman-Amuah |
| 6,601,233 B1 | 7/2003 | Underwood |
| 6,601,234 B1 | 7/2003 | Bowman-Amuah |
| 6,662,357 B1 | 12/2003 | Bowman-Amuah |
| 6,718,535 B1 | 4/2004 | Underwood |
| 6,789,254 B2 | 9/2004 | Broussard |
| 6,854,107 B2 | 2/2005 | Green et al. |
| 6,931,621 B2 | 8/2005 | Green et al. |
| 6,964,034 B1 | 11/2005 | Snow |
| 7,035,809 B2 | 4/2006 | Miller et al. |
| 7,051,036 B2 | 5/2006 | Rosnow et al. |
| 7,062,449 B1 | 6/2006 | Clark |

(Continued)

OTHER PUBLICATIONS

U.S. Appl. No. 12/173,388: Specification, Jul. 15, 2008.

(Continued)

*Primary Examiner* — Jason Dunham
*Assistant Examiner* — Deirdre Hatcher
(74) *Attorney, Agent, or Firm* — John R. Pivnichny; Law Office of Jim Boice

(57) ABSTRACT

A computer implemented method, system, and/or computer program product assigns work to a software factory for implementing a project. A project model of a project is generated. Project model subcomponents are mapped to work packets that are available to a software factory, thus leading to the generation of a work plan for performing the project via an execution of the available work packets.

17 Claims, 12 Drawing Sheets

(56) References Cited

U.S. PATENT DOCUMENTS

| | | | |
|---|---|---|---|
| 7,062,749 B2 | 6/2006 | Cyr et al. | |
| 7,080,351 B1 | 7/2006 | Kirkpatrick et al. | |
| 7,137,100 B2 | 11/2006 | Iborra et al. | |
| 7,139,999 B2 | 11/2006 | Bowman-Amuah | |
| 7,155,400 B1 | 12/2006 | Jilk et al. | |
| 7,159,206 B1 | 1/2007 | Sadhu et al. | |
| 7,197,740 B2 | 3/2007 | Beringer et al. | |
| 7,234,131 B1 | 6/2007 | Speyrer et al. | |
| 7,272,575 B2 | 9/2007 | Vega | |
| 7,292,990 B2 | 11/2007 | Hughes | |
| 7,302,674 B1 | 11/2007 | Gladieux et al. | |
| 7,318,216 B2 | 1/2008 | Diab | |
| 7,337,429 B1 | 2/2008 | Psaras et al. | |
| 7,360,201 B2 | 4/2008 | Srivastava | |
| 7,406,432 B1 | 7/2008 | Motoyama | |
| 7,406,453 B2 | 7/2008 | Mundie et al. | |
| 7,418,443 B2 | 8/2008 | Yoshimura et al. | |
| 7,421,648 B1 | 9/2008 | Davis | |
| 7,422,374 B2 | 9/2008 | Pitwon | |
| 7,483,841 B1 | 1/2009 | Jin et al. | |
| 7,516,439 B2 | 4/2009 | Robinson | |
| 7,546,575 B1 | 6/2009 | Dillman et al. | |
| 7,565,643 B1 | 7/2009 | Sweet et al. | |
| 7,603,653 B2 | 10/2009 | Sundararajan et al. | |
| 7,640,533 B1 | 12/2009 | Lottero et al. | |
| 7,693,747 B2 | 4/2010 | Bryson et al. | |
| 7,721,279 B1 * | 5/2010 | Caufield et al. | 717/170 |
| 7,735,062 B2 | 6/2010 | de Seabra e Melo et al. | |
| 7,752,606 B2 | 7/2010 | Savage | |
| 7,774,742 B2 | 8/2010 | Gupta et al. | |
| 7,774,743 B1 | 8/2010 | Sanchez et al. | |
| 7,774,747 B2 | 8/2010 | Kayam et al. | |
| 7,778,866 B2 | 8/2010 | Hughes | |
| 7,810,067 B2 | 10/2010 | Kaelicke et al. | |
| 7,823,120 B2 | 10/2010 | Kazakov et al. | |
| 7,849,438 B1 | 12/2010 | Hemmat et al. | |
| 7,853,556 B2 | 12/2010 | Swaminathan et al. | |
| 7,865,875 B2 | 1/2011 | Hockenberry et al. | |
| 7,908,582 B2 | 3/2011 | Pepin et al. | |
| 7,913,222 B2 | 3/2011 | Ogilvie et al. | |
| 7,926,029 B1 | 4/2011 | Stoyen et al. | |
| 7,958,494 B2 | 6/2011 | Chaar et al. | |
| 7,987,110 B2 | 7/2011 | Cases et al. | |
| 8,006,222 B2 | 8/2011 | Ruhe | |
| 8,056,048 B2 | 11/2011 | Stevenson et al. | |
| 8,108,855 B2 | 1/2012 | Dias et al. | |
| 8,140,367 B2 | 3/2012 | Bernardini et al. | |
| 8,141,040 B2 | 3/2012 | Chaar et al. | |
| 2001/0037494 A1 | 11/2001 | Levien et al. | |
| 2002/0029272 A1 | 3/2002 | Weller | |
| 2002/0038449 A1 | 3/2002 | Green et al. | |
| 2002/0046157 A1 | 4/2002 | Solomon | |
| 2002/0069079 A1 | 6/2002 | Vega | |
| 2002/0095650 A1 | 7/2002 | Green et al. | |
| 2002/0103731 A1 | 8/2002 | Barnard et al. | |
| 2002/0104067 A1 | 8/2002 | Green et al. | |
| 2002/0156668 A1 | 10/2002 | Morrow et al. | |
| 2002/0184071 A1 | 12/2002 | Bicknell et al. | |
| 2003/0055659 A1 | 3/2003 | Alling | |
| 2003/0093477 A1 | 5/2003 | Daimon | |
| 2003/0097650 A1 | 5/2003 | Bahrs et al. | |
| 2003/0101089 A1 | 5/2003 | Chappel et al. | |
| 2003/0106039 A1 | 6/2003 | Rosnow et al. | |
| 2003/0158760 A1 | 8/2003 | Kannenberg | |
| 2003/0192029 A1 | 10/2003 | Hughes | |
| 2003/0221184 A1 | 11/2003 | Gunjal et al. | |
| 2004/0010772 A1 | 1/2004 | McKenna et al. | |
| 2004/0015870 A1 | 1/2004 | Arbouzov et al. | |
| 2004/0030696 A1 | 2/2004 | Lechner | |
| 2004/0044617 A1 | 3/2004 | Lu | |
| 2004/0064805 A1 | 4/2004 | Sparago et al. | |
| 2004/0073886 A1 | 4/2004 | Irani | |
| 2004/0093584 A1 | 5/2004 | Le | |
| 2004/0143811 A1 | 7/2004 | Kaelicke et al. | |
| 2004/0186765 A1 | 9/2004 | Kataoka | |
| 2004/0229199 A1 | 11/2004 | Ashley et al. | |
| 2004/0255265 A1 | 12/2004 | Brown et al. | |
| 2004/0268296 A1 | 12/2004 | Kayam et al. | |
| 2005/0015678 A1 | 1/2005 | Miller | |
| 2005/0114829 A1 | 5/2005 | Robin et al. | |
| 2005/0160395 A1 | 7/2005 | Hughes | |
| 2005/0166178 A1 | 7/2005 | Masticola et al. | |
| 2005/0177260 A1 | 8/2005 | Schweizerhof et al. | |
| 2005/0198618 A1 | 9/2005 | Lalonde et al. | |
| 2005/0216882 A1 | 9/2005 | Sundararajan et al. | |
| 2005/0234698 A1 | 10/2005 | Pinto et al. | |
| 2005/0283751 A1 | 12/2005 | Bassin et al. | |
| 2006/0005157 A1 | 1/2006 | Saxena et al. | |
| 2006/0031812 A1 | 2/2006 | Olson et al. | |
| 2006/0036954 A1 | 2/2006 | Satyadas et al. | |
| 2006/0064486 A1 | 3/2006 | Baron et al. | |
| 2006/0069605 A1 | 3/2006 | Hatoun | |
| 2006/0070020 A1 | 3/2006 | Puttaswamy et al. | |
| 2006/0184933 A1 | 8/2006 | Chessell et al. | |
| 2006/0218521 A1 | 9/2006 | Hagstrom et al. | |
| 2006/0229929 A1 | 10/2006 | Hughes et al. | |
| 2006/0235732 A1 | 10/2006 | Miller et al. | |
| 2006/0248504 A1 | 11/2006 | Hughes | |
| 2006/0259524 A1 | 11/2006 | Horton | |
| 2006/0293942 A1 | 12/2006 | Chaddha et al. | |
| 2006/0294439 A1 | 12/2006 | Rolia et al. | |
| 2007/0006122 A1 | 1/2007 | Bailey et al. | |
| 2007/0006161 A1 | 1/2007 | Kuester et al. | |
| 2007/0022404 A1 | 1/2007 | Zhang et al. | |
| 2007/0067338 A1 | 3/2007 | Koizumi et al. | |
| 2007/0083813 A1 | 4/2007 | Lui et al. | |
| 2007/0094256 A1 | 4/2007 | Hite et al. | |
| 2007/0118433 A1 | 5/2007 | Bess | |
| 2007/0124231 A1 | 5/2007 | Ristock et al. | |
| 2007/0143735 A1 | 6/2007 | Clemm et al. | |
| 2007/0162170 A1 | 7/2007 | Nakamura | |
| 2007/0174810 A1 | 7/2007 | Hockenberry et al. | |
| 2007/0198558 A1 | 8/2007 | Chen | |
| 2007/0220479 A1 | 9/2007 | Hughes | |
| 2007/0233538 A1 | 10/2007 | Zpevak et al. | |
| 2007/0240154 A1 | 10/2007 | Gerzymisch et al. | |
| 2007/0288107 A1 | 12/2007 | Fernandez-Ivern et al. | |
| 2008/0034347 A1 | 2/2008 | V et al. | |
| 2008/0046859 A1 | 2/2008 | Velarde et al. | |
| 2008/0059450 A1 | 3/2008 | Joseph et al. | |
| 2008/0082956 A1 | 4/2008 | Gura et al. | |
| 2008/0082959 A1 | 4/2008 | Fowler | |
| 2008/0127040 A1 | 5/2008 | Barcellona | |
| 2008/0141242 A1 | 6/2008 | Shapiro | |
| 2008/0155508 A1 | 6/2008 | Sarkar et al. | |
| 2008/0178145 A1 | 7/2008 | Lindley | |
| 2008/0209417 A1 | 8/2008 | Jakobson | |
| 2008/0255693 A1 | 10/2008 | Chaar et al. | |
| 2008/0255696 A1 | 10/2008 | Chaar | |
| 2008/0256390 A1 | 10/2008 | Chaar | |
| 2008/0256505 A1 | 10/2008 | Chaar et al. | |
| 2008/0256506 A1 | 10/2008 | Chaar et al. | |
| 2008/0256507 A1 | 10/2008 | Chaar | |
| 2008/0256516 A1 | 10/2008 | Chaar et al. | |
| 2008/0256529 A1 | 10/2008 | Chaar | |
| 2008/0282219 A1 | 11/2008 | Seetharaman et al. | |
| 2008/0288269 A1 | 11/2008 | Herwig | |
| 2009/0043622 A1 | 2/2009 | Finlayson | |
| 2009/0043631 A1 * | 2/2009 | Finlayson et al. | 705/9 |
| 2009/0055237 A1 | 2/2009 | Henry et al. | |
| 2009/0055795 A1 | 2/2009 | Finlayson | |
| 2009/0064322 A1 | 3/2009 | Finlayson | |
| 2009/0100406 A1 | 4/2009 | Greenfield et al. | |
| 2009/0125875 A1 | 5/2009 | Schmitter et al. | |
| 2009/0204471 A1 | 8/2009 | Elenbaas et al. | |
| 2009/0210282 A1 | 8/2009 | Elenbaas et al. | |
| 2009/0271760 A1 | 10/2009 | Ellinger | |
| 2009/0300577 A1 | 12/2009 | Bernardini et al. | |
| 2009/0300586 A1 | 12/2009 | Bernardini et al. | |
| 2010/0017252 A1 | 1/2010 | Chaar et al. | |
| 2010/0017782 A1 | 1/2010 | Chaar et al. | |
| 2010/0017783 A1 | 1/2010 | Brinistool et al. | |
| 2010/0023918 A1 | 1/2010 | Bernardini et al. | |
| 2010/0023919 A1 | 1/2010 | Chaar et al. | |

(56) References Cited

U.S. PATENT DOCUMENTS

| | | | |
|---|---|---|---|
| 2010/0023920 A1 | 1/2010 | Chaar et al. | |
| 2010/0023921 A1 | 1/2010 | Chaar et al. | |
| 2010/0031090 A1 | 2/2010 | Bernardini et al. | |
| 2010/0031226 A1 | 2/2010 | Chaar et al. | |
| 2010/0031234 A1 | 2/2010 | Chaar et al. | |
| 2010/0162200 A1 | 6/2010 | Kamiyama et al. | |
| 2010/0269087 A1 | 10/2010 | Kabra | |
| 2011/0231828 A1* | 9/2011 | Kaulgud et al. | 717/131 |
| 2012/0124559 A1 | 5/2012 | Kondur | |
| 2012/0144363 A1 | 6/2012 | Bernardini et al. | |

OTHER PUBLICATIONS

U.S. Appl. No. 12/183,423: Specification, Jul. 31, 2008.
U.S. Appl. No. 12/177,315: Specification, Jul. 22, 2008.
U.S. Appl. No. 12/177,315: Non-Final Office Action, May 4, 2011.
U.S. Appl. No. 12/178,185: Specification, Jul. 23, 2008.
U.S. Appl. No. 12/183,504: Specification, Jul. 31, 2008.
U.S. Appl. No. 12/177,645: Specification, Jul. 22, 2008.
U.S. Appl. No. 12/129,304: Specification, May 29, 2008.
U.S. Appl. No. 12/129,438: Specification, May 29, 2008.
U.S. Appl. No. 12/183,566: Specification, Jul. 31, 2008.
U.S. Appl. No. 12/178,092: Specification, Jul. 23, 2008.
J. Greenfield et al., "Software Factories Assembling Applications With Patterns, Models, Frameworks and Tools", Oct. 2003, ACM 1-58113-751-6/03/0010.
J. Zhou et al., "Modeling Network Intrusion Detection Alerts for Correlation," ACM Transactions on Information and System Security, vol. 10, No. 1, Article 4, Feb. 2007, pp. 1-31.
S. Degwekar et al., "Event-Triggered Data and Knowledge Sharing Among Collaborating Government Organizations," ACM International Conference Proceeding Series, vol. 228: Proceedings of the 8th Annual International Digital Government Research Conference, Philadelphia, PA, May 20-23, 2007, pp. 102-111.
U.S. Appl. No. 12/173,175: Specification, Jul. 15, 2008.
IBM, "IBM Rational Method Composer" Copyright IBM Corporation 2006, ibm.com/software/awdtools/rmc.
Brykczynski, B., "A Survey of Software Inspection Checklists," ACM, Jan. 1999, p. 82-89.
Keil et al., "The Influence of Checklists and Roles on Software Practitioner Risk Perception and Decision-Making," IEEE, 2006, p. 1-12.
Objectbuilders, Inc., "Software Factory Assembly Methodology and Training Pathways," Copyright 2006, www.objectbuilders.com/downloads/SF_Methodology_WP.pdf.
Department of Commerce, "IT Architecture Capability Maturity Model," May 2003, 15 Pgs, http://ocio.os.doc.gov/groups/public/@doc/@os/@ocio/@oitpp/documents/content/prod01_002340.pdf.
Slaughter et al., "Aligning Software Processes With Strategy," MIS Quarterly, vol. 30, No. 4, pp. 891-918, 2006.
Musat et al., "Value Stream Mapping Integration in Software Product Lines," ACM Profes, pp. 110-111, 2010.
Rosenmuller et al., "Tailoring Dynamic Software Product Lines," ACM GPCE, pp. 3-12, 2011.
Yoshida et al., "The Integrated Software Product Line Model," IEEE pp. 538-543, 2004.
Amin et al., "A Proposed Reusability Attribute Model for Aspect Oriented Software Product Line Components," IEEE, pp. 1138-1141, 2010.
U.S. Appl. No. 12/183,566—Non-Final Office Action Mailed Nov. 9, 2011.
U.S. Appl. No. 12/177,645—Non-Final Office Action Mailed May 23, 2011.
U.S. Appl. No. 12/177,645—Notice of Allowance Mailed Nov. 2, 2011.
U.S. Appl. No. 11/735,152—Non-Final Office Action Mailed Apr. 29, 2011.
U.S. Appl. No. 11/735,152—Non-Final Office Action Mailed Feb. 15, 2012.
U.S. Appl. No. 11/735,152—Final Office Action Mailed Sep. 21, 2011.
U.S. Appl. No. 12/173,175—Non-Final Office Action Mailed Aug. 3, 2011.
U.S. Appl. No. 11/735,120—Non-Final Office Action Mailed Sep. 29, 2010.
U.S. Appl. No. 11/735,120—Notice of Allowance Mailed Feb. 1, 2011.
U.S. Appl. No. 12/129,304—Non-Final Office Action Mailed Mar. 27, 2012.
U.S. Appl. No. 11/735,056—Non-Final Office Action Mailed Dec. 23, 2010.
U.S. Appl. No. 11/735,056—Non-Final Office Action Mailed Jun. 9, 2011.
U.S. Appl. No. 11/735,056—Notice of Allowance Mailed Dec. 1, 2011.
Lucia A., et al., "Assessing the Maintenance Processes of a Software Organization: An Empirical Analysis of a Large Industrial Project," Journal of Systems and Software 2003; 65(2): 87-103.
De Lucia, A., et al., "Early Effort Estimation of Massive Maintenance Processes," Software Maintenance, 2002. Proceedings. International Conference on, pp. 234-237.
U.S. Appl. No. 12/177,315—Examiner's Answer Mailed Mar. 27, 2012.
U.S. Appl. No. 12/129,438—Requirement for Information Under 37 CFR 1.105 Mailed Apr. 12, 2012.
U.S. Appl. No. 11/835,200—Non-Final Office Action Mailed May 26, 2011.
U.S. Appl. No. 11/835,200—Notice of Allowance Mailed Nov. 28, 2011.
Coqueiro et al., "Developing Portlets Using Eclipse and Websphere Portlet Factory," IBM, Jun. 5, 2006.
Kramer, "IBM Websphere Portlet Factory 5.11.3," Patricia Seybold Group, Mar. 2006.
U.S. Appl. No. 11/844,031—Non-Final Office Action Mailed Nov. 28, 2011.
IBM, "Service-Oriented Web Application Development With IBM Websphere Portlet Factory Software," Mar. 2006.
U.S. Appl. No. 11/847,952—Non-Final Office Action Mailed Aug. 30, 2011.
U.S. Appl. No. 11/847,952—Non-Final Office Action Mailed Mar. 5, 2012.
Dominguez et al., "Quality in Development Process for Software Factories According to ISO 15504", Jun. 2006, CLEI Electronic Journal, vol. 9, No. 1, Paper 3.
U.S. Appl. No. 11/735,086—Non-Final Office Action Mailed May 18, 2012.
U.S. Appl. No. 11/844,031—Final Office Action Mailed May 25, 2012.
U.S. Appl. No. 11/735,275—Non-Final Office Action Mailed Jun. 5, 2012.
IBM, "IBM Web Experience Factory (Formerly Websphere Portlet Factory)" Web Site, Retrieved From [URL: http://www-01.ibm.com/software/genservers/webexperiencefactory/] on Oct. 3, 2011.
U.S. Appl. No. 12/173,388—Non-Final Office Action Mailed Jun. 24, 2011.
U.S. Appl. No. 12/177,315—Non-Final Office Action Mailed May 4, 2011.
U.S. Appl. No. 12/177,315—Final Office Action Mailed Nov. 2, 2011.
U.S. Appl. No. 12/129,438—Request for Information Under Rule 105 Mailed Oct. 18, 2011.
IBM, "Best Practices for Service-Oriented Model Development With IBM Websphere Portlet Factory Software," Mar. 2006, pp. 1-16.
U.S. Appl. No. 11/735,099—Non-Final Office Action Mailed Apr. 16, 2012.
U.S. Appl. No. 11/836,937—Non-Final Office Action Mailed Apr. 18, 2012.
U.S. Appl. No. 11/735,070—Non-Final Office Action Mailed Apr. 26, 2012.
U.S. Appl. No. 12/183,566—Notice of Allowance Mailed May 9, 2012.

(56) References Cited

OTHER PUBLICATIONS

U.S. Appl. No. 12/178,185—Non-Final Office Action Mailed May 8, 2012.
U.S. Appl. No. 12/173,175—Non-Final Office Action Mailed May 4, 2012.
U.S. Appl. No. 12/178,092—Non-Final Office Action Mailed Jun. 20, 2012.
U.S. Appl. No. 12/183,423, —Non-Final Office Action Mailed Jul. 3, 2012.
U.S. Appl. No. 12/183,504, —Notice of Allowance Mailed Aug. 8, 2012.
Regio, M. and Greenfield, J., "Designing and Implementing a Software Factory," MSDN, Jan. 2006, 10 Pgs.
Greenfield, J., "Software Factories: Assembling Applications With Patterns, Models, Frameworks, and Tools," MSDN, Nov. 2004, 15 Pgs.
Forsberg et al., "Managing Outsourcing of Software Development", Stockholm University/Royal Institute of Technology, Dept. of Computer and Systems Sciences, Master Thesis, Spring 2001, pp. 1-54.
U.S. Appl. No. 12/129,438—Non-Final Office Action Mailed Dec. 19, 2012.
Amaral, J., et al., "Analyzing Supply Chains at HP Using Spreadsheet Models," Interfaces, Jul./Aug. 2008, vol. 38, No. 4, pp. 228-240.
U.S. Appl. No. 12/173,175—Notice of Allowance Mailed Nov. 29, 2012.
Lenz, G., and Wienands, C., "Practical Software Factories in .Net", Springer-Verlag, New York, NY, USA, 2006, pp. 1-230.
U.S. Appl. No. 12/178,185—Notice of Allowance Mailed Oct. 2, 2012.
U.S. Appl. No. 11/735,168—Final Office Action Mailed Oct. 18, 2012.
U.S. Appl. No. 11/735,086—Final Office Action Mailed Oct. 22, 2012.
U.S. Appl. No. 12/129,304—Final Office Action Mailed Nov. 16, 2012.
U.S. Appl. No. 11/735,152—Notice of Allowance Mailed Jun. 15, 2012.
Wells, D., et al., "Taming Cyber Incognito Tools for Surveying Dynamic/Reconfigurable Software Landscapes", Working Conference on Complex and Dynamic Systems Architectures, Brisbane, Australia, Dec. 2001, pp. 13-24, <http://www.dtic.mil/cgi-bin/GetTRDoc?Ad=ADA419185>.
Mitritek Systems, Inc., "Building Quality Intelligent Transportation Systems Through Systems Engineering", Apr. 2002, pp. 1-71, <http://ntl.bts.gov/jpodocs/repts_te/13620.html>.
U.S. Appl. No. 11/847,952—Final Office Action Mailed Sep. 4, 2012.
U.S. Appl. No. 11/735,070—Final Office Action Mailed Sep. 19, 2012.
U.S. Appl. No. 12/129,304—Notice of Allowance Mailed Sep. 13, 2013.
U.S. Appl. No. 11/844,031—Notice of Allowance Mailed Sep. 20, 2013.
M. De Vries and J. Greenfield, "Measuring Success With Software Factorie and Visual Studio Team System," Microsoft Corporation, Nov. 2006, pp. 1-43.
J. Greenfield, "The Case for Software Factories", Microsoft Corporation, Jul. 2004, pp. 1-16.
U.S. Appl. No. 13/785,780—Notice of Allowance Mailed Oct. 9, 2013.
U.S. Appl. No. 13/492,110—Notice of Allowance Mailed Nov. 15, 2013.

\* cited by examiner

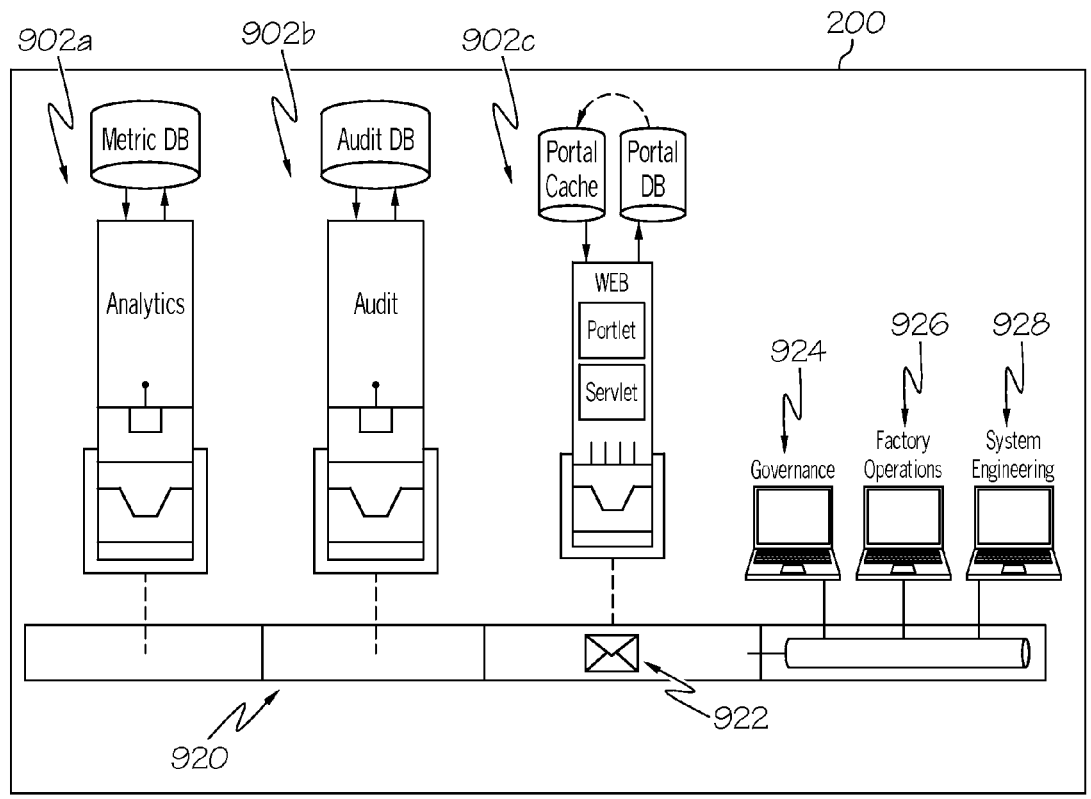
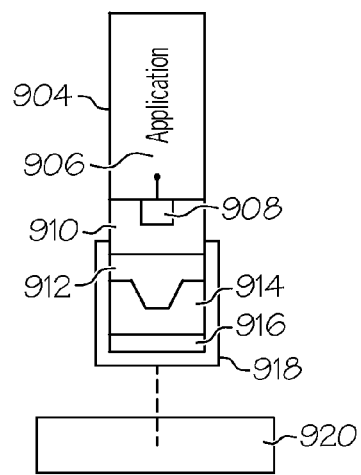
FIG. 9

MODEL-DRIVEN ASSIGNMENT OF WORK TO A SOFTWARE FACTORY

The present disclosure relates in general to the field of computers, and more particularly to the use of computers when implementing processes or methods. Still more particularly, the present disclosure relates to the use of computers when executing processes described by project models via execution of work packets in a software factory.

In a mature service delivery organization, processes or methods form the basis for the structuring of activities that are required to deliver a service, such as software development, testing, or maintenance. These processes or methods describe the steps to be taken in order to create both the intermediate artifacts (use cases, architectural design models, test cases, etc. . . . ) and the final deliverables (running systems or code) that the service provides. This collection of artifacts and their current state are referred to as the project model. However, process or method definitions typically take into account only those dependencies between activities that arise as a result of the process/method design itself. When a method is adopted/implemented to perform the delivery of an actual service, dependencies due to project-specific artifacts that comprise the project model must also be taken into consideration. However, the environment in which the process actually takes place is not considered by the process definition itself. Furthermore, in order to execute the described process, assignment of required activities has previously been a manual process, which is error-prone, slow, and costly.

BRIEF SUMMARY

A computer implemented method, system, and/or computer program product assigns work to a software factory for implementing a project. A project model of a project for a specific service delivery is generated. Project model subcomponents are mapped to work packets that are available to a software factory, thus leading to the generation of a work plan for performing the project via an execution of the available work packets.

BRIEF DESCRIPTION OF THE SEVERAL VIEWS OF THE DRAWINGS

FIG. 9 shows an environment in which software factory analytics and dashboards are implemented;

DETAILED DESCRIPTION

Figure 1:
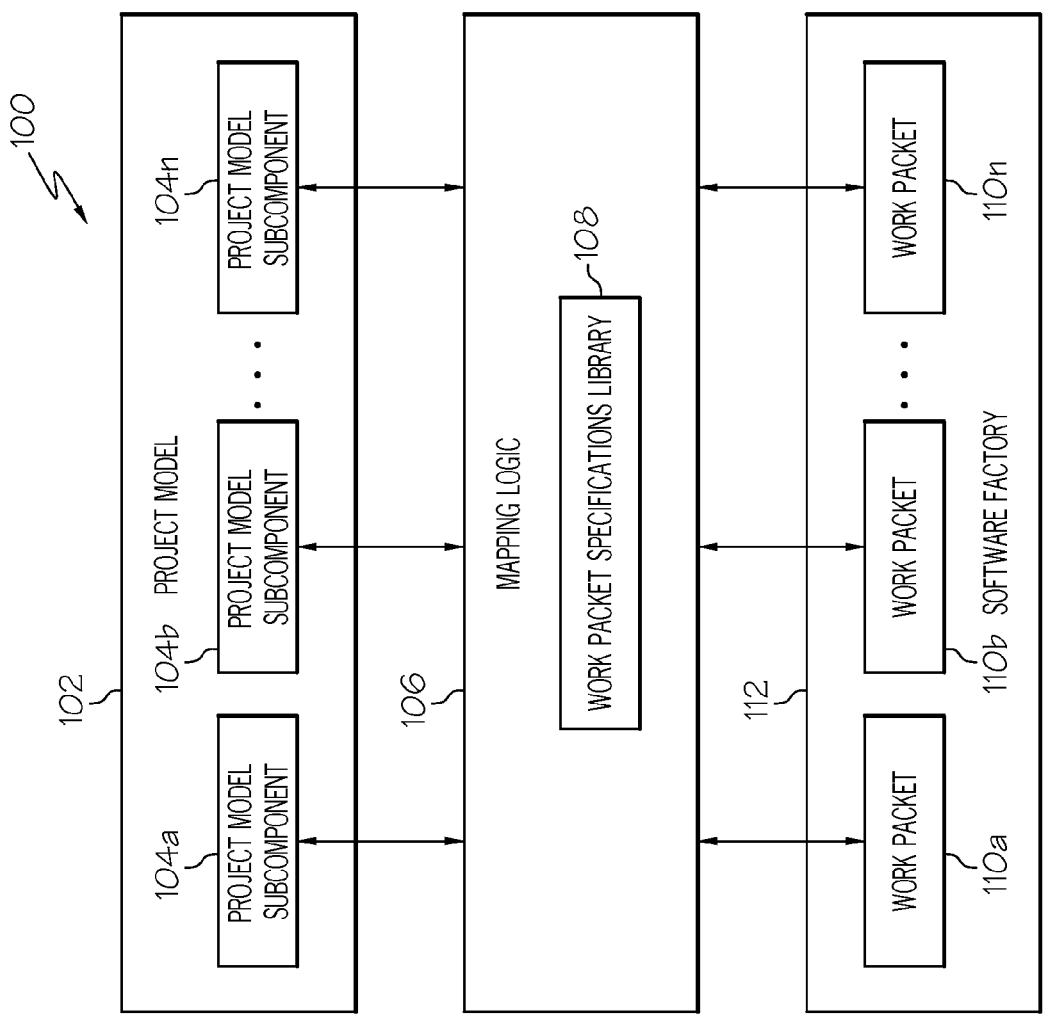
FIG. 1 is an overview of a relationship between a project model and a software factory using a mapping logic described in one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to the figures, and particularly to FIG. 1, a system 100 comprises various components used by a computer (more specifically, one or more hardware processors) to assign work to a software factory in accordance with one embodiment of the present invention. A project model 102 includes both executable and non-executable project model subcomponents 104a-n (where "n" is an integer), which when performed will generate some type of product/project artifact. That is, the project model 102 describes various activities that are to be performed in order to create a product and/or complete a project.

Thus, in a mature service delivery organization, the project model 102 forms the basis for the structuring of activities that are required to deliver a service, such as software development, software testing, software maintenance, etc. However, rather than the project model 102 just taking into account only those dependencies between activities that arise as a result of the method design of the process model 102 itself, when a method is adopted to perform the delivery of an actual service, dependencies due to project-specific artifacts (such as an architectural design model) are also taken into consideration.

In one embodiment, the project model 102 uses method content as a template for the work plan. These methods (i.e., subactivities, object oriented programming (OOP) objects, etc.) describe activities performed for the specific project. For example, the Software Process Engineering Metamodel (SPEM) provides a specification language for the definition of software engineering processes, which is then converted into a service model, which may be made up of specialized Uniform Modeling Language (UML) code that introduces requisite interfaces for the processes. This service model is further refined to provide method definitions (inputs, outputs, roles, activities, etc. associated with an OOP object), which are then exported to a collaborative environment for automatically deploying subprojects to the software factory.

As depicted in FIG. 1, a mapping logic 106 comprises a work packet specifications library 108. This work packet specifications library 108 includes descriptions of the function, environment, context and constraints of each of the work packets 110a-n found in a software factory 112. That is, each of the work packets 110a-n will 1) perform a particular function, such as sorting data, generating a graph, exporting/importing data, etc.; 2) have certain hardware architectural requirements, such as running on a particular type of machine under a certain type of operating system/application; 3) be designed to work in the context of a certain type of industry (e.g., to meet the requirements of industry-specific legal regulations), a certain language, etc.; and 4) be designed to work under certain constraints, such as cost constraints, time constraints, service level agreement (SLA) constraints, etc. The work packet specifications library 108 contains entries for these features of the work packets 110a-n, and thus "knows" what the capabilities and/or limitations of each of the work packets 110a-n are.

The work packet specifications library 108 can thus receive a signal, from a computer that is managing the project model 102, indicating that a certain project model subcomponent (e.g., 104a) needs to be performed by an appropriately mapped work packet (e.g., work packet 110a) that is currently available for execution by the software factory 112.

As depicted in FIG. 1, one embodiment of the present invention utilizes a software factory 112. Details of an exemplary software factory are now presented.

A software factory (e.g., software factory 112) includes a collection of business and Information Technology (IT) governance models, operational models, delivery methods, metrics, environment and tools bundled together to improve the quality of delivered software systems, control cost overruns, and effect timely delivery of such systems. The software factories described herein offer a practical solution to developing software products using multiple sites that may be geographically distributed. The software factories execute work packets, which are self-contained work units that are composed of processes, roles, activities, applications and the necessary input parameters that allow a team to conduct a development activity in a formalized manner with visibility to progress of their effort afforded to the requesting teams.

The software factories utilized herein are scalable efficiency model constructs that transform a traditional software development art form into a repeatable scientific managed engineered streamline information supply chain. These software factories incorporate applied system and industrial engineering quality assured efficiencies that provide for the waste eliminating, highly optimized performed instrumentation, measured monitoring and risk mitigated management of software development.

Software Factory Overview

Figure 2:
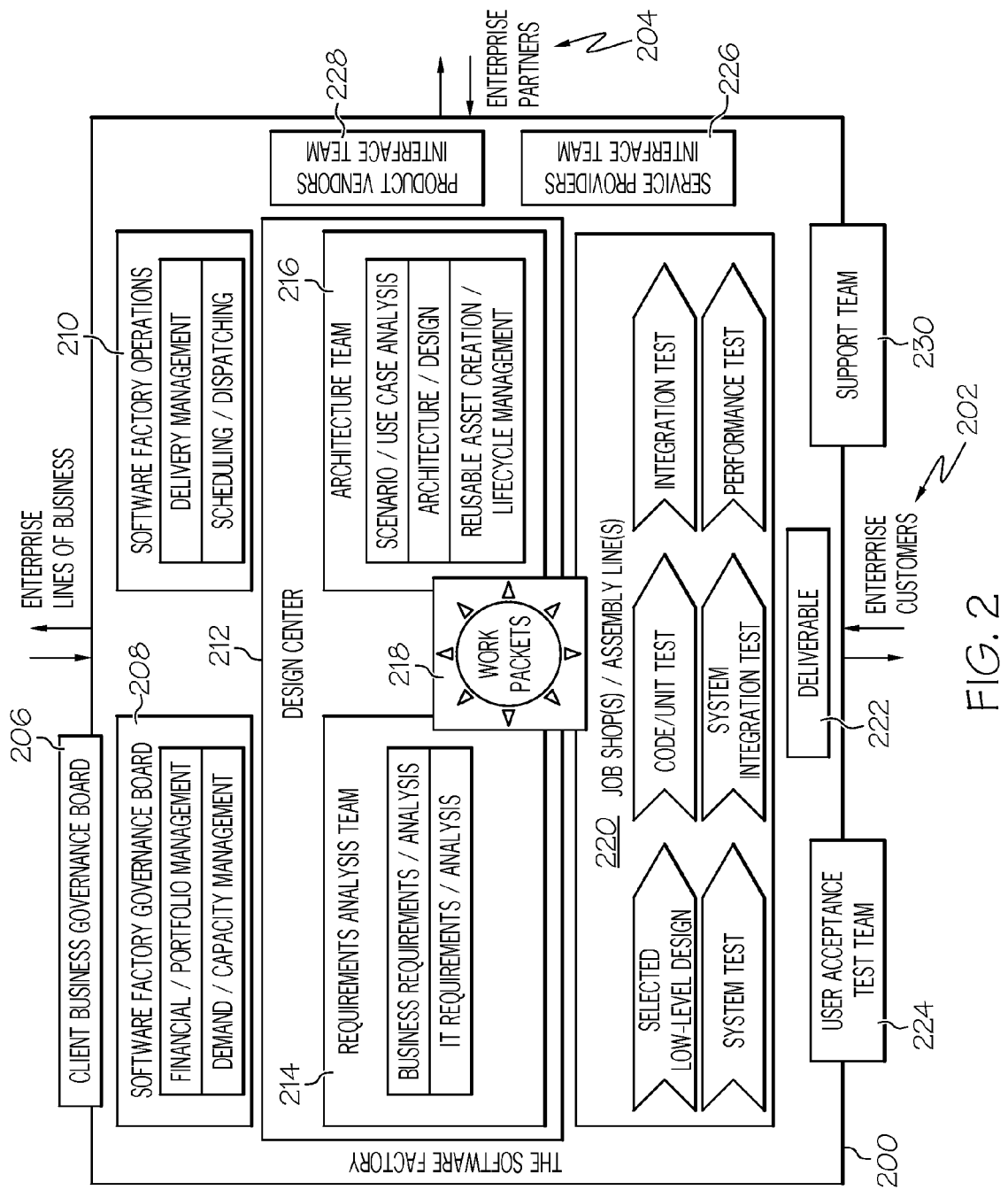
FIG. 2 provides additional exemplary detail of the software factory depicted in FIG. 1.

With reference now to FIG. 2, an overview of one embodiment of a software factory 200 is presented. As depicted, the software factory 200 is a service that interacts with both enterprise customers (i.e., client customers) 202 as well as enterprise collaborators (i.e., third party vendors) 204. The primary human interface with the enterprise customers 202 is through a Client Business Governance Board (CBGB) 206. CBGB 206 represents client stakeholders and client business sponsors that fund a project of the software factory 200. CBGB 206 can be an internal or external client. That is, the same enterprise (i.e., internal client) may include both CBGB 206 and software factory 200, or a first enterprise (i.e., external client) may have CBGB 206 while a second enterprise has the software factory 200. As described in greater detail below, a project proposal definition is then run through a software factory induction process in a Software Factory Governance Board (SFGB) 208 and Software Factory Operations (SFO) 210, where the project proposal definition is evaluated, qualified, scored and categorized. The project proposal definition is then subject to a System Engineering Conceptual Requirements Review by the SFGB 208. Based on the outcome of the review by the SFGB 208, a decision is made to accept the project proposal definition or to send it back to the CBGB 206 for remediation and resubmission through the Software Factory Induction Process.

Thus, Software Factory Governance, which includes SFGB 208 and SFO 210, provides the guidance, constraints, and underlying enforcement of all the factory policies and procedures, in support of their governing principles in support of the strategic objects of the Software Factory 200. Software Factory governance consists of factory business, IT and operations governance. The principles, policies and procedures of these models are carried out by two governing bodies—the Business Governance Board and the IT Governance Board (both part of SFGB 208), and an enforcement body—the Software Factory Operations 210.

Thus, Software Factory Governance is responsible for:
Business and IT strategic planning;
Assuring that Business and IT strategies are aligned;
Setting Goals;
Monitoring those Goals;
Detecting Problems in Achieving those goals;
Analyzing Problems;
Identifying Reasons;
Taking Action;
Providing Feedback; and
Re-Strategizing (Continue process improvement).

As soon as a project is deemed worthy to proceed, the job of creating the custom software is sent to a Design Center 212, where the project is broken into major functional areas, including those handled by a Requirements Analysis Team 214 and an Architectural Team 216.

The Requirements Analysis Team 214 handles the Requirement Management side of the Design Center 212, and is responsible for collecting the business requirements from the lines of business and populating these requirements into the tools. Analysis of business requirements is also carried out in order to derive associated IT requirements. Some requirements (e.g. system requirements) may have a contractual constraint to use a certain infrastructure. Requirements are analyzed and used in the basis for business modeling. These requirements and their representative business models (contextual, event and process models) are then verified with and signed off from project stakeholders. Requirements are then base-lined and managed within release and version control.

The Architectural Side of the Design Center 212 is handled by the Architecture Team 216, which takes the output of the requirement/analysis/management side of the design center, and uses architectural decision factors (functional requirements, non-functional requirements, available technology, and constraints), to model a design with appropriate example representation into detail design specification, that is bundled with other pertinent factors into a work packet for assembly lines to execute.

Work Packets 218 are reusable, self-contained, discrete units of software code that constitute a contractual agreement that governs the relationship among Design Center 212, Software Factory Governance Board 208, Software Factory Operations 210, and Assembly Line 220. That is, each work packet 218 includes governance policies and procedures (e.g., including instructions for how work reports are generated and communicated to the client), standards (e.g., protocol for the work packet 218), reused assets (e.g., reusable blocks of code, including the requirements, instructions and/or links/pointers associated with those reusable blocks of code), work packet instructions (e.g., instructions for executing the work packet 218), integration strategy (e.g., how to integrate the work packet 218 into a client's security system), schedule (e.g., when deliverables are delivered to the client), exit criteria (e.g., a checklist for returning the work packet 218 and/or deliverables to the software factory 200), and Input/Output (I/O) work products (e.g., artifact checklist templates for I/O routines). A "deliverable" is defined as a unit of software that is in condition for delivery to, and/or execution on behalf of, a customer or client. Thus, in the context of the present invention, a deliverable is defined as an output product of the software factory that is described herein.

Assembly Line(s) 220 (Job Shop(s)) receive and execute the work packets 218, which are specified by the Design Center 212, to create a customized deliverable 222. A "deliverable" is defined as a unit of software that is in condition for delivery to, and/or execution on behalf of, a customer or client. Thus, in the context of the present invention, a deliverable is defined as an output product of the software factory that is described herein. As shown in exemplary manner, the assembly line 220 puts the work packets 218 into a selected low-level design to generate a deliverable (executable product). While assembly line 220 can be a manual operation in which a coding person assembles and tests work packets, in another embodiment this process is automated using software that recognizes project types, and automatically assembles work packets needed for a recognized project type.

Various tests can be performed in the assembly line 220, including a code/unit test, integration test, system test, system integration test, and performance test. "Code/unit test" tests the deliverable for stand-alone bugs. "Integration test" tests the deliverable for compatibility with the client's system. "System test" checks the client's system to ensure that it is operating properly. "System integration test" tests for bugs that may arise when the deliverable is integrated into the client's system. "Performance test" tests the deliverable as it is executing in the client's system. Note that if the deliverable is being executed on a service provider's system, then all tests described are obviously performed on the service provider's system rather than the client's system.

A User Acceptance Test Team 224 includes a client stakeholder that is charged with the responsibility of approving acceptance of deliverable 222.

Software factory 200 may utilize enterprise collaborators 204 to provide human, hardware or software support in the generation, delivery and/or support of deliverables 222. Such third party contractors are viewed as a resource extension of the software factory 200, and are governed under the same guidelines described above.

If an enterprise collaborator 204 is involved in the generation of work packets 218 and/or deliverables 222, an interface between the software factory 200 and the enterprise collaborator 204 may be provided by a service provider's interface team 226 and/or a product vendor's interface team 228. Service provided by an enterprise collaborator 204 may be a constraint that is part of contractual agreement with a client to provide specialized services. An example of such a constraint is a required integrated information service component that is referenced in the integration design portion of the work packet 218 that is sent to assembly line 220. Again, note that third party service providers use a standard integration strategy that is defined by the software factory 200, and, as such, are subject to and obligated to operate under software factory governance.

Product vendor's interface team 228 provides an interface with a Product Vendor, which is an enterprise collaborator 204 that provides software factory 200 with supported products that may be used within a software factory solution. Product Vendors are also responsible for providing product support and maintaining vendor's relationships, which are managed under the software factory's governance guidelines.

Support Team 230 includes both Level 2 (L2) support and Level 1 (L1) support.

L2 Support is provided primarily by Software Engineers, who provide problem support of Software Factory produced delivered code for customers. That is, if a deliverable 222 doesn't run as designed, then the software engineers will troubleshoot the problem until it is fixed. These software engineers deliver technical assistance to Software Factory customers with information, tools, and fixes to prevent known software (and possibly hardware) problems, and provide timely responses to customer inquiries and resolutions to customer problems.

L1 support is primarily provided by an L1 Help Desk (Call Center). L1 Help Desk support can be done via self-service voice recognition and voice response, or by text chat to an automated smart attendant, or a call can be directed to a Customer Service Representative (CSR). Customer Service Representatives in this role provide first line of help problem support of Software Factory produced deliverables. Such help includes user instruction of known factory solution procedures. For any related customers issues that cannot be resolved through L1, the L1 Help Desk will provide preliminary problem identification, create trouble ticket entry into trouble tracking system, which then triggers a workflow event to dynamically route the problem issue to an available and appropriate L2 support group queue.

Note that in one embodiment software factory 200 is virtual. That is, the different components (e.g., software factory governance board 208, software factory operations 210, design center 212, assembly line 220) may be located in different locations, and may operate independently under the control of information found in work packets 218. In a preferred embodiment, each of the different components of the software factory 200 publishes a set of services that the component can provide and a set of requirements for using these services. These services are functions that are well defined and made visible for outside entities to call.

For example, assume that assembly line 220 publishes a service that it can assemble only work packets that include code and protocol that utilize a certain software development platform. Thus, the assembly line 220 has published its service (set of services includes "assembling work packets") and the required protocol (set of requirements includes "utilize company A's software development platform") to the design center 212, which must decide if it wants (or is able) to utilize that particular assembly line 220. If not, then another assembly line from another software factory may be called upon by the design center 212. Behind each offered service are the actual processes that a component performs. These processes are steps taken by the service. Each step is performed by a section of software, or may be performed by an individual who has been assigned the task of performing this step. Each step utilizes leveraged tools, including the work packets 218 described herein. These work packets 218 then implement the process.

By utilizing published interfaces between the different components of the software factory 200, the different components from different software factories can be interchanged according to the capability offered by and protocol used by each component. This enables a "building block" architecture to be implemented through the use of different components from different software factories.

Life Cycle of a Work Packet

Figure 3:
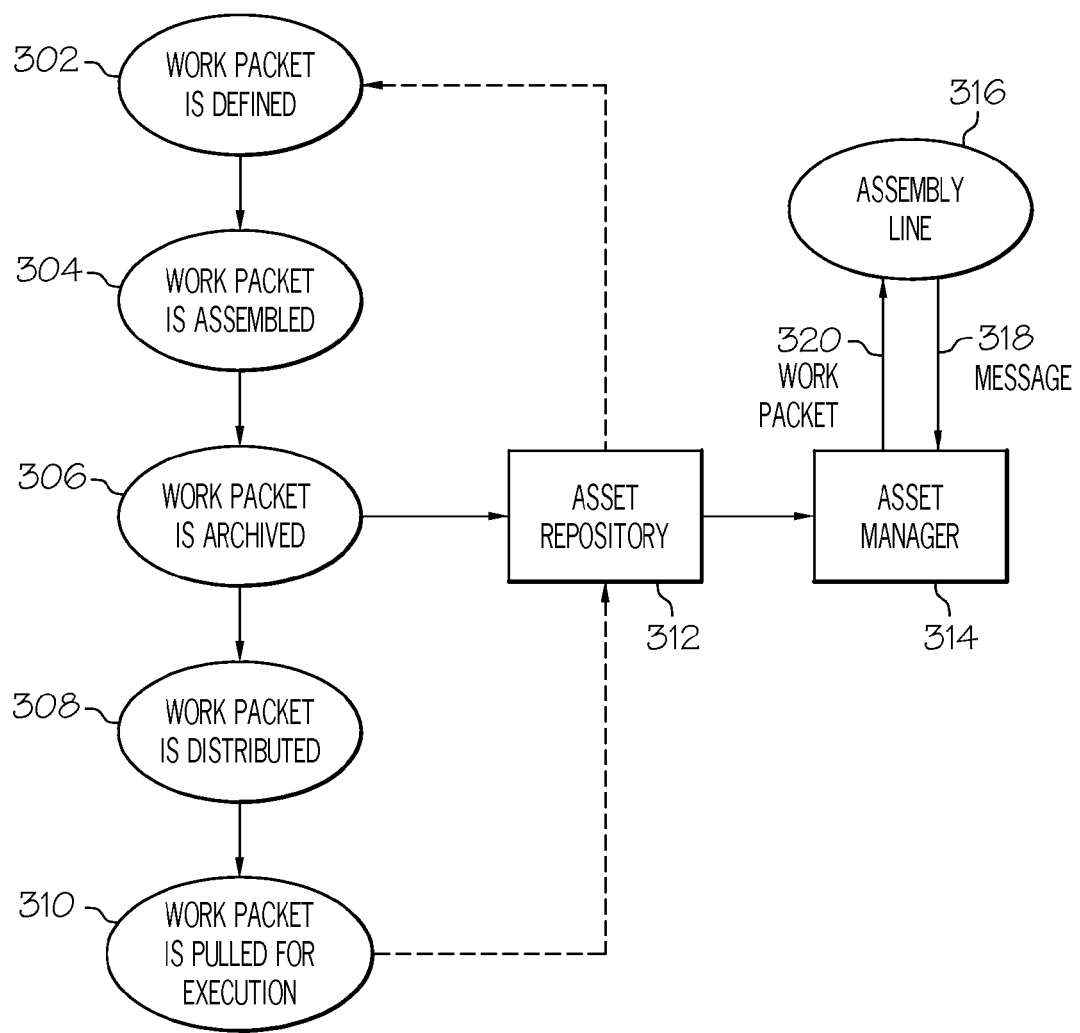
FIG. 3 presents an overview of the life cycle of work packets in the software factory.

In one embodiment of the software factories described herein, there are five phases in the life cycle of a work packet, which are shown in FIG. 3. These five phases are 1) Defining (block 302); 2) Assembling (block 304); Archiving (block 306); Distributing (block 308); and Pulling for Execution (block 310). As indicated by the top dashed line coming out of asset repository 312, this life cycle may be recursive. That is, in one embodiment, work packets are modified and upgraded in a recursive manner, which includes the steps shown in FIG. 3. Once a work packet is assembled and archived, it is stored in an asset repository 312, whence the work packet may be accessed and utilized by an asset manager 314 for assembly into a deliverable by an assembly line 316. Note that the assembly line 316 can also send, to the asset manager 314, a message 318 that requests a particular work packet 320, which can be pulled (block 310) into the asset repository 312 by the asset manager 314. This pulling step (block 310), is performed through intelligent routing distribution (block 308) to the asset repository 312 and assembly line 316. The configuration of the routing distribution of the work packet 320 is managed by the asset manager 314, which is software that indexes, stores and retrieves assets created and used with the software factory.

Work Packet Components

As noted above, a work packet is a self-contained work unit that comprises processes, roles, activities (parts of the job), applications, and necessary input parameters that allow a team to conduct a development activity in a formalized manner, with visibility to progress of their effort afforded to requesting teams. A work packet is not a deliverable software product, but rather is a component of a deliverable software product. That is, a work packet is processed (integrated into a system, tested, etc.) to create one or more deliverables. Deliverables, which were created from one or more work packets, are then combined into a custom software, such as an application, service or system.

In a preferred embodiment, a work packet is composed of the following eight components:

Governance Policies and Procedures—these policies and procedures include protocol definitions derived from a project plan. That is, a project plan for a particular custom software describes how work packets are called, as well as how work packets report back to the calling plan.

Standards—this component describes details about how work packets are implemented into a deliverable in a standardized manner. Examples of such standards are naming conventions, formatting protocol, etc.

Reused Assets—this component includes actual code, or at least pointers to code, that is archived for reuse by different assembled deliverables.

Work Packet Instructions—this component describes detailed instructions regarding how a work packet is actually executed. That is, work packet instructions document what work packets need to be built, and how to build them. These instructions include a description of the requirements that need to be met, including design protocols, code formats, and test parameters.

Integration Strategy—this component describes how a set of work packets, as well as deliverables developed from a set of work packets, are able to be integrated into a client's system. This component includes instructions regarding what processes must be taken by the client's system to be prepared to run the deliverable, as well as security protocols that must be followed by the deliverable. The component may also include a description of how one deliverable will interact with other applications that are resident to the client's computer system.

Scheduling—this component describes when a set of work packets are to be sent to an assembly line, plus instructions on monitoring the progress and status of the creation of the work packet.

Exit Criteria—this component includes instructions (e.g., through the use of a checklist) for deploying a deliverable to the client's system. That is, this component is the quality criteria that the deliverable must meet before it can be considered completed and acceptable for a project.

Input Work Products—this component includes Input/Output (I/O) templates that are used to describe specific work products that are needed to execute the activities of the work packet (in the assembly line) to build the deliverable.

Defining a Work Packet

The process of defining a work packet is called a "work packet definition process." This process combines critical references from governance, factory operations (e.g., factory management, project management), business criteria, and design (including test) artifacts. Structured templates enable governance, design center, and factory operations to define the referenced artifacts by filling in corresponding functional domain templates, thus defining the contents of the work packet. Thus, a work packet includes not only reusable software code, but also includes governance and operation instructions. For example, a work packet may include directions that describe a sequence of steps to be taken in a project; which data is to be used in the project; which individuals/ departments/job descriptions are to perform each step in the project; how assigned individuals/departments are to be notified of their duties and what steps/data are to be taken and used, et al. Thus, each work packet includes traceability regarding the status of a job, as well as code/data/individuals to be used in the execution of a project.

Thus, work packets are created from unique references to governance, factory operations (factory mgt, project mgt), business, and design (including test) artifacts. The packet definition process provides structure templates that enable governance, design center, and factory operations to define referenced artifacts (newly defined artifact identifiers or any reusable part of existing work packet definitions), by filling in corresponding functional domain (e.g., eXtensible Markup Language—XML) templates. What can be defined may be controlled by a Document Type Definition (DTD). The DTD states what tags and attributes are used to describe content in the deliverable, including where each XML tag is allowed and which XML tags can appear within the deliverable. XML tag values are defined and applied to a newly defined XML template for each functional area of a design center. These XML templates are then merged into one hierarchical structure when later assembled into finalized work packets.

Figure 4:
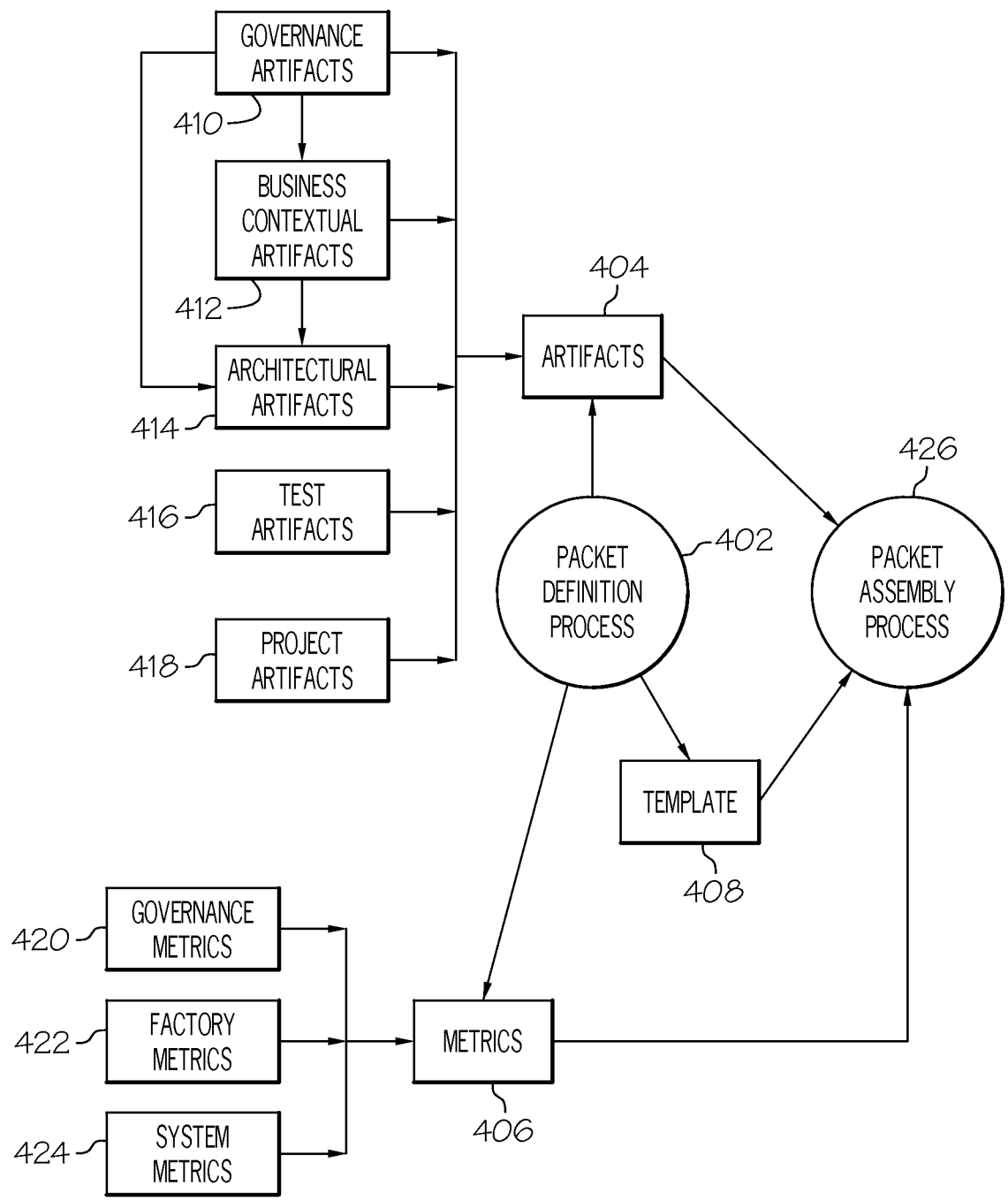
FIG. 4 presents an overview of an environment in which a packet definition process occurs.

With reference now to FIG. 4, an overview of the environment in which a packet definition process 402 occurs is presented. The packet definition process 402 calls artifacts 404, metrics 406, and a template 408 to define a work packet. The artifacts may be one or more of: governance artifacts 410 (executable assets produced in the software factory by the Software Factory Governance Board 108 described in FIG. 1); business contextual artifacts 412 (executable assets produced in the software factory by business analysts in the requirement analysis team 114 described in FIG. 1); architectural artifacts 414 (executable assets produced by the architecture team 116 described in FIG. 1); test artifacts 416 (executable assets produced by test architects in the architecture team 116 shown in FIG. 1); and project artifacts 418 (executable assets produced in the software factory by system engineers in the design center 112 shown in FIG. 1).

The metrics 406 may be one or more of: governance metrics 420 (measurable governance indicators, such as business plans); factory metrics 422 (measurable indicators that describe the capabilities of the software factory, including assembly line capacity); and system metrics 424 (measurable indicators that describe the capabilities of the client's computer system on which deliverables are to be run).

Based on a template 408 for a particular deliverable, artifacts 404 and metrics 406 are used by a packet assembly process 426 to assemble one or more work packets.

Assembling a Work Packet

Template 408, shown in FIG. 4, describes how a work packet is to be assembled. The template 408 includes metadata references to key artifacts 404 and metrics 406, which are merged into a formal work packet definition as described above. The work packet is then assembled in a standardized hierarchical way and packaged within a factory message envelope that contains a header and body.

Figure 5:
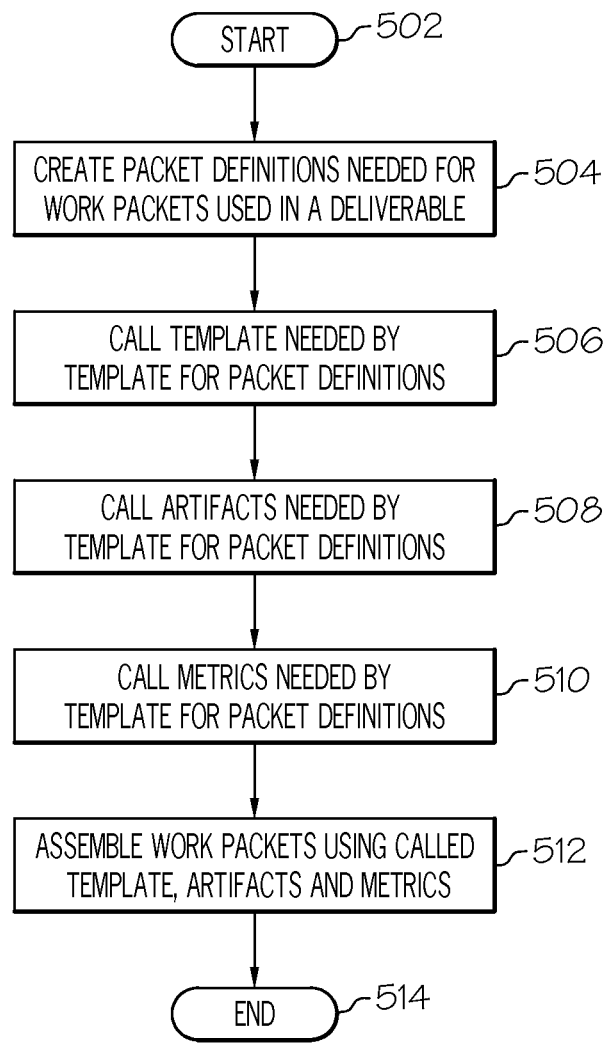
FIG. 5 is a high-level flow-chart of steps taken to define and assemble work packets.

With reference now to FIG. 5, a high-level flow-chart of steps taken to define and assemble work packets is presented. After initiator block 502 (which may be an order by the Requirements Analysis Team 114 to the Architecture Team 116, shown in FIG. 1, to create a design center-defined work packet), the requisite packet definitions are created for work packets that are to be used in deliverables (block 504). First, a template, which preferably is a reusable that has been used in the past to create the type of work packet needed, is called (block 506). Based on that called template, the needed artifacts (block 508) and metrics (block 510) are called. Using the template as a guide, the called artifacts and metrics are assembled in the requisite work packets (block 512), and the process ends.

Archiving Work Packets

As stated above, work packets are fungible (easily interchangeable and reusable for different deliverables). As such, they are stored in an archival manner. In order to retrieve them efficiently, however, they are categorized, classified, and named. The name of the work packet may be created by the architect who originally created the work packet. Preferably, the name is descriptive of the function of the work packet, such as "Security Work Packet", which can be used in the assembly of a security deliverable. A work packet header may describe whether the work packet is proprietary for a particular client, such that the work packet may be reused only for that client. A description (coded, flagged, etc.) for what the work packet is used for may be included, as well as the names of particular components (such as the eight components described above).

An alternate header for a work packet may contain a unique identification number ("Work Packet ID"), a short description of the work packet ("Work Packet Description"), a description of the type of work packet ("Work Packet Type," such as "security," "spreadsheet," etc.), and the identifier ("Parent Packet ID") of any parent object from which the work packet has inheritance.

Exemplary pseudocode for defining the work packet is:

```
[Work Packet Definition - Stored in Asset Repository]

<Factory Envelope ClientCode = 999, Version =1.0 ,
FactoryInstanceID = 012, ProjectID=1001>
<Header>
.....
.....
.....
......
</Header>
<Body>
<Asset ID>
<Asset Type>
<Project Type>
<Work Packet ID = ####,CreationDate =011007, Source = DC100>
<Work Packet Description>
<Work Packet Type [1-90]>
<Parent Packet ID = ####>
<Governance>
<Governance_Artifact ID = #### Type = 1 [Policy,Procedure,]>
<Governance_Artifact ID .....>
<Governance_Artifact ID ....>
<Governance_Artifact ID ....>
</Governance>
<Business>
<Business_Artifact ID = ### Type = 2 [1=Success Factor,
2=Use Case, 3=Business Context, 4= NFR, etc>
<Business_Artifact ID = ### Type = 2>
<Business_Artifact ID = ### Type = 2>
<Business_Artifact ID = ### Type = 2>
</Business>
<Architecture Artifact ID Type = 3 [ 1= Information, 2=Data,
3=Application,4=Integration, 5=Security,
6=System, 7=Test, etc.]>
<Architecture_Artifact ID >
<Architecture_Artifact ID >
<Architecture_Artifact ID >
<Architecture_Artifact ID >
<Architecture_Artifact ID>
<Architecture_Artifact ID>
<Architecture_Artifact ID>
<Architecture_Artifact ID>
</Architecture>
<Project ID = xxx>
<Project Artifact ID = ####>
<Project Artifacts>
<Project Metrics>
</Project>
</Work Packet>
</Body>
</Factory Envelope>
```

Figure 6:
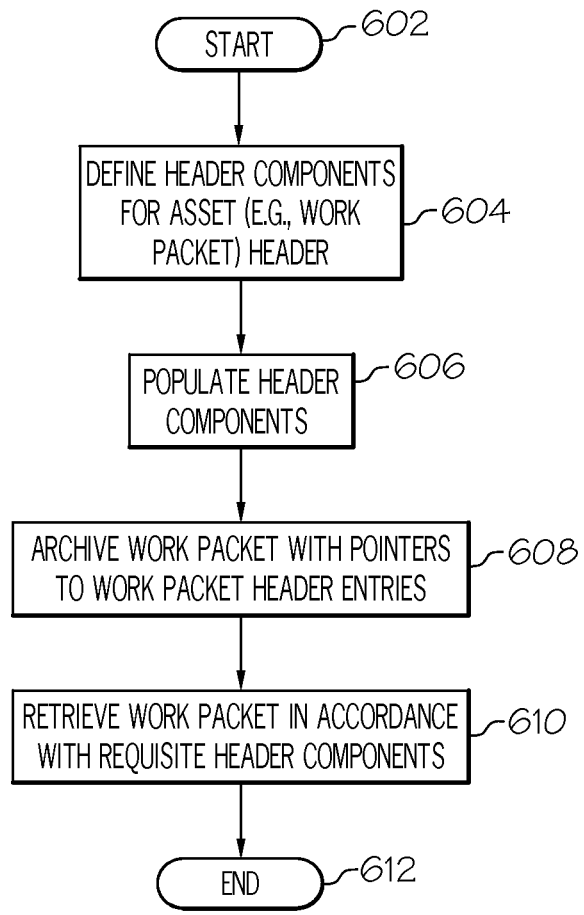
FIG. 6 is a high-level flow-chart of steps taken to archive a work packet.

With reference now to FIG. 6, a high-level flow chart of steps taken to archive a work packet is presented. After initiator block 602, an architect defines header components for an asset (e.g. a work packet) header (block 604). Note that these header components allow an Asset Repository to perform a metadata categorization search of the assets. These header components may be any that the programmer wishes to use. After the header components are defined, the architect populates them with descriptors (block 606). A system manager or software then archives (stores) the work packet, including the header (block 608). At a later time, a program or programmer can retrieve the work packet by specifying information in the header (block 610). For example, if the program or programmer needs a work packet that is of a "Security" type that follows "Standard 100", then "Work packet one" can be retrieved at an address such as "Address 1". Note, however, that this work packet cannot be utilized unless it is to be used in the construction of a deliverable for the client "Client A." The process ends at terminator block 612.

Software Factory Readiness Review

Before a software factory can receive an order from a client to create work packets and their resultant deliverables/applications, a determination should be made to determine whether the factory is ready to take on project work. This determination can be made through the use of a scorecard, which provides a maturity assessment of the factory. An exemplary scorecard is as follows:

1. Factory Resource Plan (Business and IT Environment) completed
2. Infrastructure (Hardware, Network) procurement completed
3. Operational Software installed
4. Integrated Tools installed
   a. Design Center
      i. Requirement Management
      ii. Business Modeling
      iii. Architectural Modeling
      iv. Test Management
      v. Configuration (Release) Management
      vi. Change Management
   b. Execution Units
      i. IDE (Integrated Development Environment)
5. Automate information handled (Service Oriented Architecture (SOA)—reusable model for Factory Installations)
6. Process, equipment and product data integrated and statistically analyzed
7. Enterprise Service Bus installed
   a. Common Services
      i. Audit (DB)
      ii. Business Transaction Monitoring
      iii. Performance Monitoring
      iv. System Monitoring
      v. Message Translation/Transformation
      vi. Analysis (Data Analytics)
      vii. Packet Assembly
      viii. Session Management
      ix. Security Model Configuration
      x. Process Server Configuration
      xi. Communication Protocol Bridges
   b. Resource Management
   c. Asset Management
   d. Portal Server
   e. Factory Induction Server
   f. Message Oriented Middleware
      i. Hub
      ii. Router (DB)
      iii. Persistent and Durable Queues (Databases)
   g. Service Activators (Shared Components)
8. Workflow Engine installed
9. Workflow Event Model configured
10. Problem-solving organization (internal factory operations (infrastructure)) maintenance developed
11. Operational Support (System, Open Communication Channel, Defined and Enforced Process and Procedures) hosted
12. Project Management Plan in place
13. Project scheduled
14. Factory Activity scheduled
15. On-boarding—Setup and configuration
16. Ongoing capacity planned
17. Execution Units (Assembly Line) balanced
18. Human Resources planned
    a. Reduce the division of labor
    b. Secure the requisite talent 19. Factory process implemented to make factory mistake-proof (continued process improvement)
20. Introductions and assembly of new process technology managed
21. In-line assembly inspected (done via Reviews)
22. Factory induction process in place
23. Communication channels cleared and defined In one embodiment of the present invention, all of these steps are taken before a project is taken on by the Software Factory Governance Board 206 described above in FIG. 2. These steps ensure the health and capacity of the software factory to create and assemble work packets into a client-ordered deliverable.

Software Factory on-Boarding

As indicated in Step 15 of the Factory Readiness Review process, software factory on-boarding is a rapid process that uses a series of checklist questionnaires to help with the rapid set-up and configuration of the software factory.

The software factory on-boarding process is an accelerator process model that enables the roll out configuration of uniquely defined software factor instances. This is a learning process that leverages patterns used in prior on-boarding exercises. This evolution provides a pertinent series of checklist questionnaires to qualify what is necessary for a rapid set-up and confirmation of a factory instance to support a project. Based on project type assessments, installed factory patterns can be leveraged to forecast what is necessary to set up a similar factory operation.

Exemplary steps taken during a rapid software factory on-boarding are:
  a. Auto-recipe (configuration) download
    i. Populate Activities/Task into workflow
    ii. Configure Message Router
    iii. Configure (queues) communication channels per governance model
    iv. Set up logistics (assess, connectivity) internal maintenance team support (location)
    v. Fast ramp new production processes
    vi. Configure Security model
      1. User accounts
      2. Roles and privileges
        a. Network Access
        b. OS File Directory
        c. Database
    vii. Configure Event Model
    viii. Configure Infrastructure Servers
    ix. Distribute Network Logistics
  b. Resource Allocation (including human resources available)

Rapid on-boarding provides a calculated line and work cell balancing capability view of leveraged resources, thus improving throughput of assembly lines and work cells while reducing manpower requirements and costs. The balancing module instantly calculates the optimum utilization using the fewest operators to achieve the result requested. Parameters can be varied as often as needed to run "what-if" scenarios.

Figure 7:
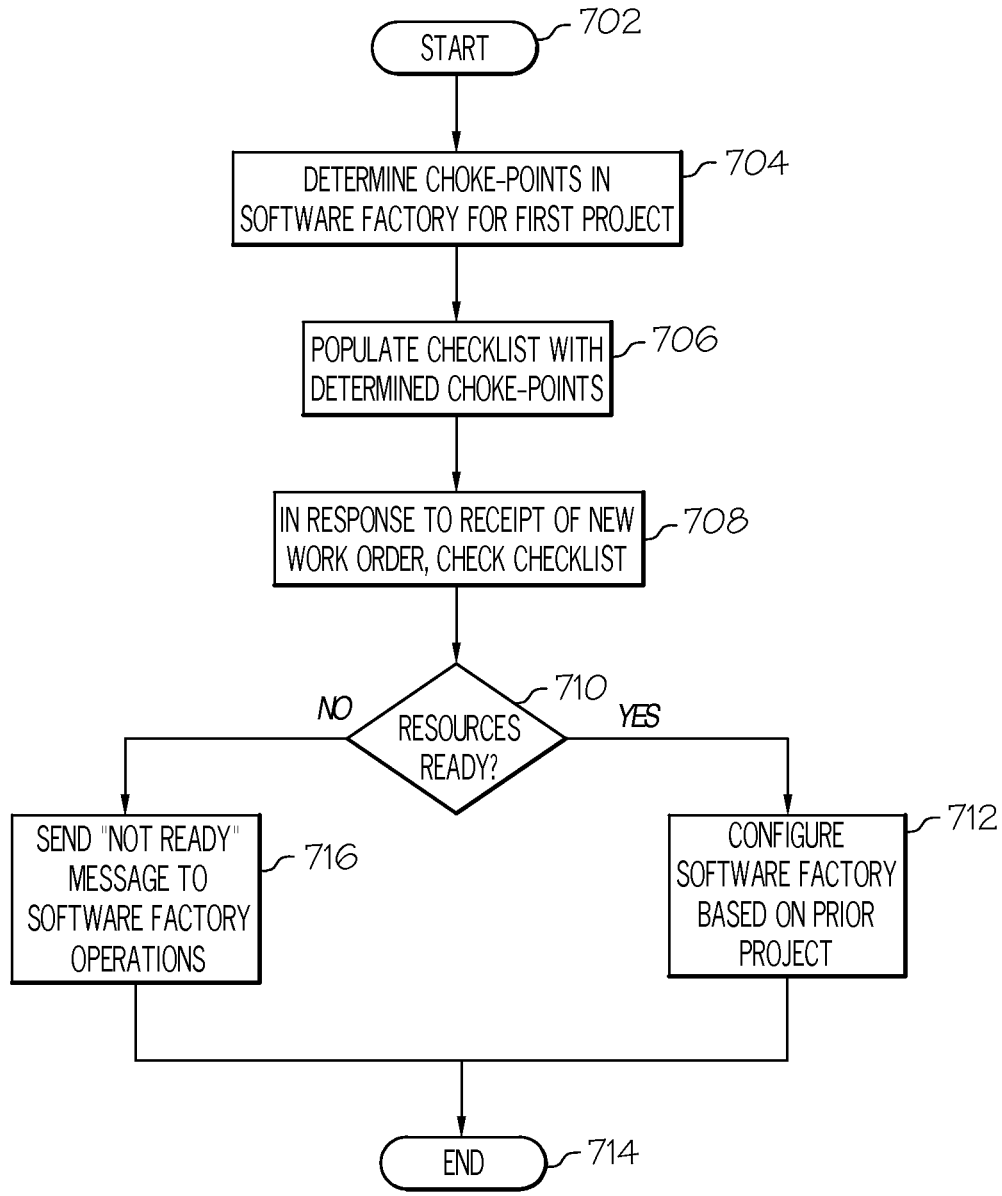
FIG. 7 is a high-level flow-chart of steps taken to rapidly on-board a software factory.

With reference now to FIG. 7, a high-level flow-chart of exemplary steps taken for rapidly on-boarding a software factory is presented. After initiator block 702, processes used by a software factory, including choke-points, are determined for a first project (block 704). These processes (and perhaps choke-points) lead to a checklist, which describes the processes of the first process (block 706). Examples of processes include, but are not limited to, the creation of work packets, testing work packets, etc. Examples of choke-points include, but are not limited to, available computing power and memory in a service computer in which the software factory will run; available manpower; available communication channels; etc. When a new work project comes in to the software factory, the checklist can be used by the Software Factory Operations 210 (shown in FIG. 2) to check processes/choke-points that can be anticipated by the new work project (block 708). That is, assume that the first project and the new project are both projects for creating a computer security program. By using a checklist that identifies similar mission-critical processes and/or choke-points when creating a computer security program, a rapid determination can be made by a programmer (or automated software) as to whether the software factory is capable of handling the new work project. If the checklist is complete, indicating that all mission-critical resources are ready and no untoward choke-points are detected (block 710), then the software factory is configured (block 712) as before (for the first project), and the process ends (terminator block 714). However, if the resources are not ready, then a "Not Ready" message is sent back to the Software Factory Operations (such as to the Software Factory Governance Board) (block 716), thus ending the process (terminator block 714), unless the Software Factory Governance Board elects to retry configuring the software factory (either using the rapid on-board process or the full process described above).

Project Induction Process

Before a software project is accepted by the software factory, it should first be inducted. This induction process provides an analysis of the proposed software project. The analysis not only identifies what processes and sub-processes will be needed to create the software project, but will also identify potential risks to the software factory and/or the client's computer system.

Figure 8:
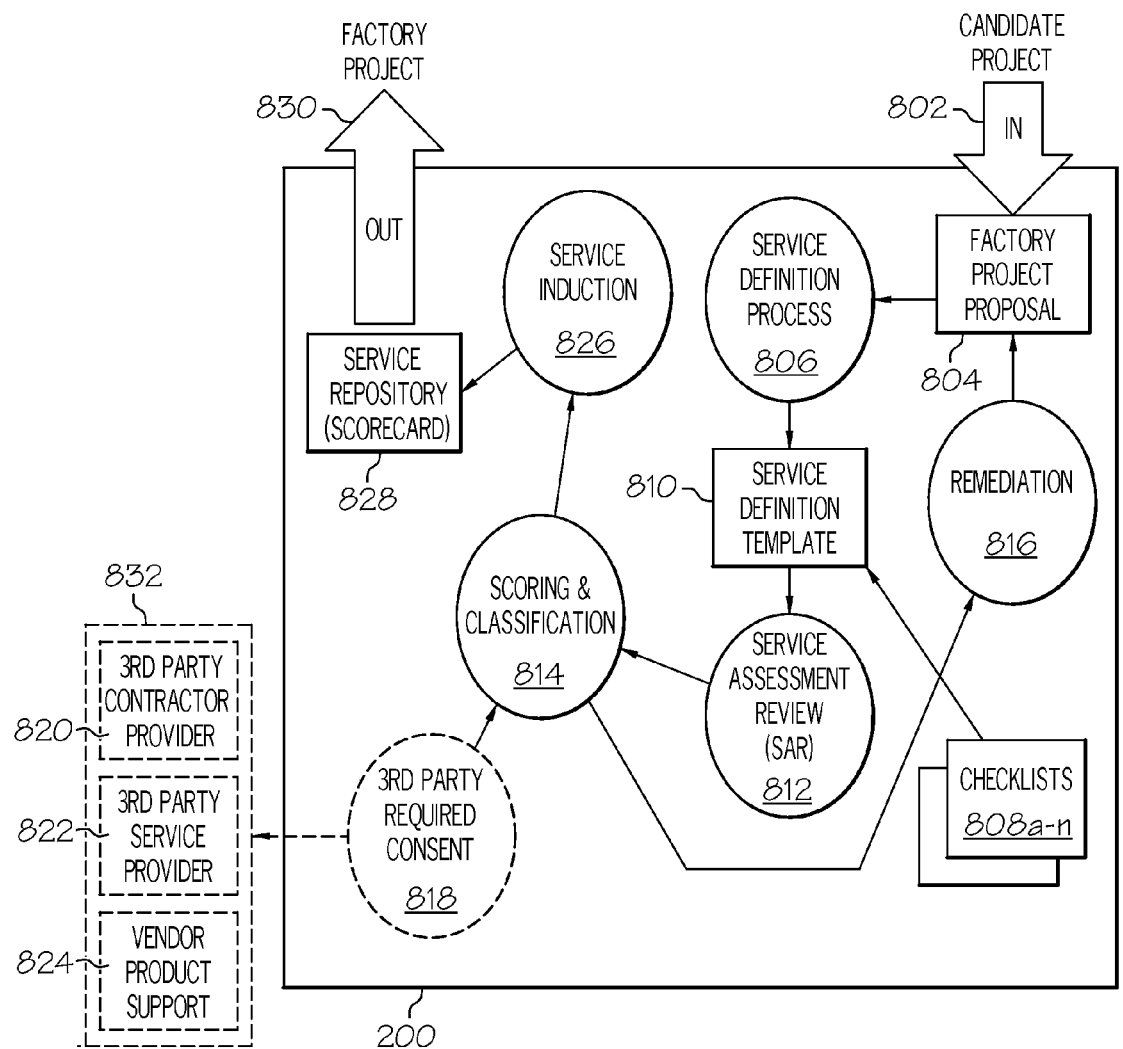
FIG. 8 is a flow-chart of exemplary steps taken to induct a project in a software factory.

With reference now to the flow-chart shown in FIG. 8, a candidate project 802 is submitted to software factory 200 (preferably to the Software Factory Governance Board 208 shown in FIG. 2) as a factory project proposal 804. The factory project proposal 804 then goes through a service definition process 806.

Service definition process 806 utilizes electronic questionnaire checklists 808 to help define a service definition template 810. Checklists 808 are a collection of drill down checklists that provide qualifying questions related to the candidate project 802. The questions asked in the checklists 808 are based on pre-qualifying questions. That is, pre-qualification questions are broad questions that relate to different types of projects. Based on the answers submitted to questions in the pre-qualification questions, a specific checklist from checklists 808*a-n* is selected. Thus, assume that pre-qualification questions include four questions: 1) Who is the client? 2) Is the project security related? 3) Will the project run on the client's hardware? 4) When is the proposed project due? Based on answers that are input by the client or the software factory governance board, one of the checklists 808*a-n* will be selected. That is, if the answers for the four questions were 1) Client A, 2) Yes, 3) Yes and 4) Six months, then a checklist 808*b*, which has questions that are heuristically known (from past projects) to contain the most relevant questions for such a project is then automatically selected.

Returning to FIG. 8, the selected checklists 808 are then used to generate the service definition template 810, which is essentially a compilation of checklists 808 that are selected. Service definition template 810 is then sent to a Service Assessment Review (SAR) 812. SAR 812 is a weighted evaluation process that, based on answers to qualifying, and preferably closed ended (yes/no), questions derived from the service definition template 810, evaluates the factory project proposal 804 for completeness and preliminary risk assessment. SAR 812 provides an analysis of relevant areas of what is known (based on answers to questions found in the service definition template 810) and what is unknown (could not be determined, either because of missing or unanswered questions in the service definition template 810) about the candidate project 802. Thus, the outcome of SAR 812 is a qualification view (gap analysis) for the factory project proposal 804, which provides raw data to a scoring and classification process 814.

The scoring and classification process 814 is a scoring and tabulation of the raw data that is output from SAR 812. Based on the output from SAR 812, the scoring and classification process 814 rates the factory project proposal 804 on project definition completeness, trace-ability and risk exposure. If the service definition template 810 indicates that third parties will be used in the candidate project 802, then the scoring and classification process 814 will evaluate proposed third party providers 832 through the use of a third party required consent process 818.

The third party required consent process 818 manages relationships between third party providers 832 and the software factory 100. Example of such third party providers 832 include, but are not limited to, a third party contractor provider 820 (which will provide software coding services for components of the candidate project 802), a third party service provider 822 (which will provide an execution environment for sub-components of the candidate project 802), and vendor product support 824 (which provides call-in and/or on-site support for the completed project). The determination of whether the third party providers 832 and the software factory 200 can work in partnership on the project is based on a Yes/No questionnaire that is sent from the software factory 200 to the third party providers 832. The questionnaire that is sent to the third party providers 932 includes questions about the third party's financial soundness, experience and capabilities, development and control process (including documentation of work practices), technical assistance that can be provided by the third party (including available enhancements), quality practices (including what type of conventions the third party follows, such as ISO 9001), maintenance service that will be provided, product usage (including a description of any licensing restrictions), costs, contracts used, and product warranty.

If the factory project proposal 804 fails this scoring process, it is sent back to a remediation process 816. However, if scoring process gives an initial indication that the factory project proposal 804 is ready to be sent to the software factory, then it is sent to the service induction process 826.

Once the factory project proposal 804 has gone through the SAR process 812 and any third party coordination has been met, scored and classified, the factory project proposal 804 is then inducted (pre-qualified for approval) by the service induction process 826. During the service induction process 826, the scored and classified project is sent through a Conceptual Requirements Review, which utilizes a service repository scorecard 828 to determine if the software factory 200 is able to handle the candidate project 802. That is, based on the checklists, evaluations, scorecards and classifications depicted in FIG. 8, the candidate project 802 receives a final evaluation to determine that the software factory 200 has the requisite resources needed to successfully execute the candidate project 802. If so, then the candidate project becomes a factory project 830, and a contract agreement is made between the client and the service provider who owns the software factory 200.

Note that work packets are created in accordance with the client's needs/capacities. An optimal way to determine what the client's needs/capacities is through the use of checklists. A standard checklist, however, would be cumbersome, since standard checklists are static in nature. Therefore, described now is a process for generating and utilizing dynamic checklists through the use of a Software Factory Meta-Morphic Dynamic Restructuring Logic Tree Model. This model provides the means to expedite checklist data collections, by dynamically restructuring and filtering non-relevant checklist questions, depending on answers evaluated in real time. Such a model not only enables a meta-data driven morphing of decision trees that adapt to the relevancy of what is deemed an applicable line of questioning, but also provides a highly flexible solution to pertinent data collection.

Software Factory Health Maintenance

The software factory described herein should be monitored for a variety of issues. Such monitoring is performed by a Software Factory Analytics and Dashboard, which ensures that both a single instance and multiple instances of the Factory can function smoothly. The monitored metrics include project metrics as well as factory operations, system, business, and performance activities. The analytics of the overall health of the factory can be audited and monitored and used as a basis for continual process improvement strategic analysis and planning. This ensures fungibility and consistency, provides quality assurance, reduces the risk of failure, and increases cost effectiveness.

The health of the software factory is monitored through messages on an Enterprise Service Bus (ESB), which is a bus that is that couples the endpoint processes of the software factory with dashboard monitors. An ESB provides a standard-based integration platform that combines messaging, web services, data transformation and intelligent routing in an event driven Service Oriented Architecture (SOA). In an ESB-enabled, event-driven SOA, applications and services are treated as abstract endpoints, which can readily respond to asynchronous events. The SOA provides an abstraction away from the details of the underlying connectivity and plumbing. The implementations of the services do not need to understand protocols. Services do not need to know how messages are routed to other services. They simply receive a message from the ESB as an event, and process the message. Process flow in an ESB can also involve specialized integration services that perform intelligent routing of messages based on content. Because the process flow is built on top of the distributed SOA, it is also capable of spanning highly distributed deployment topologies between services on the bus.

As stated above, the messages that flow on the ESB contain measurable metrics and states that are received through an event driven Service Oriented Architecture (SOA) Model. This information is via XML data stream messages, which can contain factory operation, system, business and performance and activity related metrics, which provide a relative point of origin for low level measurement. The messages can be used in analytics of the factory's overall health, which is audited and monitored, and can be used as a basis for continual process improvement strategic analysis and planning. Upon update, the data stream is analyzed and the aggregated Key Performance Indicators (KPIs) are calculated and sent to the dashboard display device, where the XML is applied to a style template and rendered for display.

The Health Monitoring System provides factory exception and error reporting, system monitoring, Performance Monitoring and Reporting, Proactive and Reactive Alert Notification, Message Auditing and Tracking Reporting, Daily View of Activity, and Historical Reports. Information collected includes what information (regarding the software factory metrics) was sent, to whom it was sent, when it was sent, and how many messages were sent via the ESB interface between the software factory and the client's system.

Information in the messages includes timestamps for the sender (from the software factory), the receiver (in the analytic section), and the hub (the ESB). Derived metrics include:
What Service Requestor and Provider are Most Problematic?
Re-factoring
Redesign
Quality Analysis Improvement
Detail Review
Review of Error Strategy
What Requestor and Provider are Most Active?
Quantitative Analysis
Forecast Trends and Budgeting
Strategic Analysis and Planning
Market Analysis and Planning
How Long It Took to Process
Resource Realignment
Capacity Planning
What Requestor and Provider are Least Active?
Optimization and Re-factoring
Redesign
Realignment of Strategic and Marketing Planning
Capacity Planning Realignment
Governance—Metrics
  Compliance—reporting responsibility, procedural and policy execution
  Continual Process Improvement
  Comparative analysis against baseline and performance objectives
  Factory Contractual Analysis
  Financial—Profitability
    Increase Revenue
    Lower Costs
Design Center—Metrics
  Asset Type Creation Analysis per project type
  When (date/time) Work Packets Definitions are created by project
  Work Packet creation Rate
  Work Packet to Project Type Pattern Analysis
  Design Compliance (Execution Units), Asset/Artifact Reuse
  Design Solution Pattern Analysis per Work Packet Type
Asset Management—Metrics
  Asset Repository Growth Rate
  Asset Repository Mix
  Asset Reuse Rate
  Project Asset Usage Patterns
Project—Metrics
  Project Proposal Induction Attempt/Success Ratio
  Factory Project Client/Industry Analysis
  Resource Availability, Activity and Tasks Status
  Milestone Achievement Rate/Status
  Schedule Analysis
  Budget/Cost Analysis
  Risk Identification
  Issue Tracking
  Defect Tracking Resolution, Project Asset Usage Patterns
  Intelligent Forecaster
Factory Operations—Metrics
  Approved Project Pipeline
  Project Throughput Rate Analysis
  Informational Analysis
  Work Packet Distribution Analysis
  Capacity Planning (Forecast/Logistics/Availability)
  Resource Inventory Levels
  Factory Utilization Rate
  Workload Characterization
  Transactional Analysis
  Performance Analysis Distribution
  Traffic Analysis
  Equipment and Facilities
  Head count and Human Resources Data Applied to Physical Resources
  Worker Turnover Rate
  Labor Analysis (hours, overtime, per type of factory worker)
  Process Technologies Used
  Production Volumes
  Factory Operation Trouble Ticket/Problem Resolution (e.g. internal factory operations (infrastructure) maintenance)
Factory Financials—Metrics
  Revenue per Project
  Operational Costs per Project
    Fixed
    Variable
  Profit per Project
  Profit per Project Type
System Engineering Analysis
  System Engineering—Project Risks
  System Engineering—Software Defects
  System Engineering—Issue Tracking and Resolution
  SEAT Review Scorecards Results
    CRR—Conceptual Requirements Review
    BRR—Business Requirements Review
    SRR—System Requirements Review
    PDR—Preliminary Design Review
    CDR—Critical Design Review
    TRR—Test Readiness Review
    PRR—Production Readiness Review
    FRR—Factory Readiness Review
  Quality Assurance Cause Effect Correlation Analysis
Execution Units—Metrics
  Work Packet Consumption Rate
  Start (date/time) Work Packet Execution
  Finish (date/time) Work Packet Execution
  Number of Multi-discipline Trained Execution Unit Workers
  Availability Rate
  Quality Rating per Worker Referring now to FIG. 9, an environment for Software Factory Analytics and Dashboard is presented in a software factory 200. Note that three exemplary service endpoints 902a-c are depicted. Service endpoint 902a provides analytic service for measurements taken in the software factory 200. Service endpoint 902b provides an audit service, which determines which analytic measurements should be taken. Service endpoint 902c provides a web service that affords analytic measurements and dashboards to be transmitted in HTML or other web-based format to a monitor. Details of a service endpoint include the application (service software) 904, an application interface 906, a resource adapter 908, a managed connection 910, a client interface 912, an ESB endpoint 914, an invocation and management framework 916 (protocol stacks that can be sued for transporting messages across an ESB), and a service container 918 (an operating system process that can be managed by the invocation and management framework 916).

Each service endpoint 902 is coupled to the Enterprise Service Bus (ESB) 920, to which XML message 922 (or similar markup language formatted messages) can flow to governance monitors 924, factory operations monitors 926 and/or system engineering monitors 928, on which the messages generate dashboard progress messages.

Figure 10:
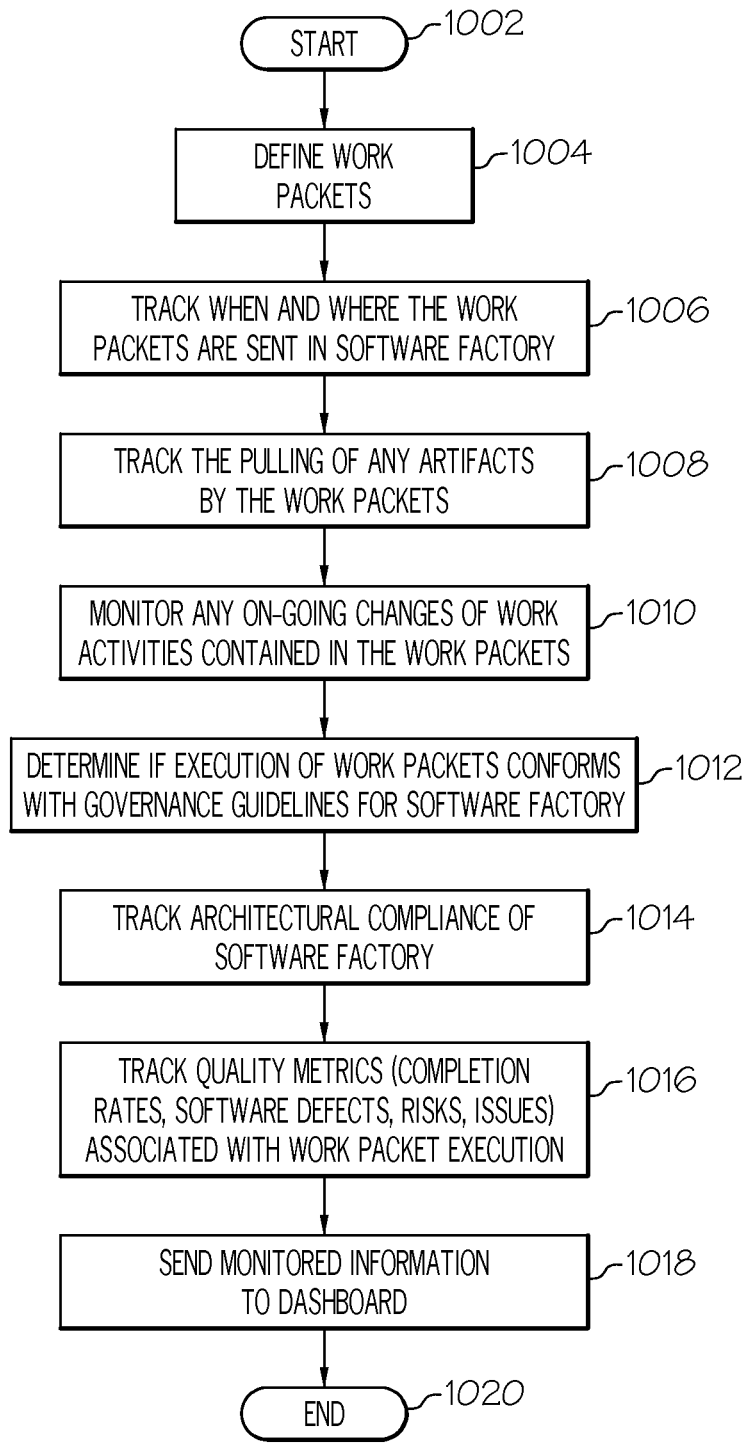
FIG. 10 is a flow-chart showing exemplary steps taken to monitor a software factory.

With reference now to FIG. 10, a flow-chart of exemplary steps taken to monitor the health of a software factory is presented. After initiator block 1002 (which may be prompted by the acceptance of a work project as described above), work packets are first defined (block 1004). As described above, these work packets are then sent to the assembly area. This transmittal is tracked (block 1006) by sending a message to an Enterprise Service Bus (ESB). This message contains information about where and when the work packet was sent to the assembly line. If the work packet pulls an artifact (such as artifacts 404 described in FIG. 4), another message is sent to the ESB for tracking purposes (block 1008). Similarly, messages are sent to the ESB if there are any on-going changes of work activities contained in the work packets (block 1010). Execution of the work packets is monitored to ensure that such execution conforms to governance guidelines that have been previously set for the software factory (block 1012). Similarly, the software factory is monitored to ensure that work packets comply with the architecture of the software factory (block 1014).

Quality metrics are also monitored for the execution of the work packets in the assembly line area (block 1016). That is, as different work packets are executed, assembled and tested in the assembly line area, the quality of such operations is tracked. These metrics include, but are not limited to, those described above, plus completion rates, detection of software defects, hazards (risks) caused by the execution of the work packets and other issues. This information (and optionally any other information monitored and tracked in block 1006 to 1014) is sent on the ESB to a dashboard in a monitoring display.

Figure 11:
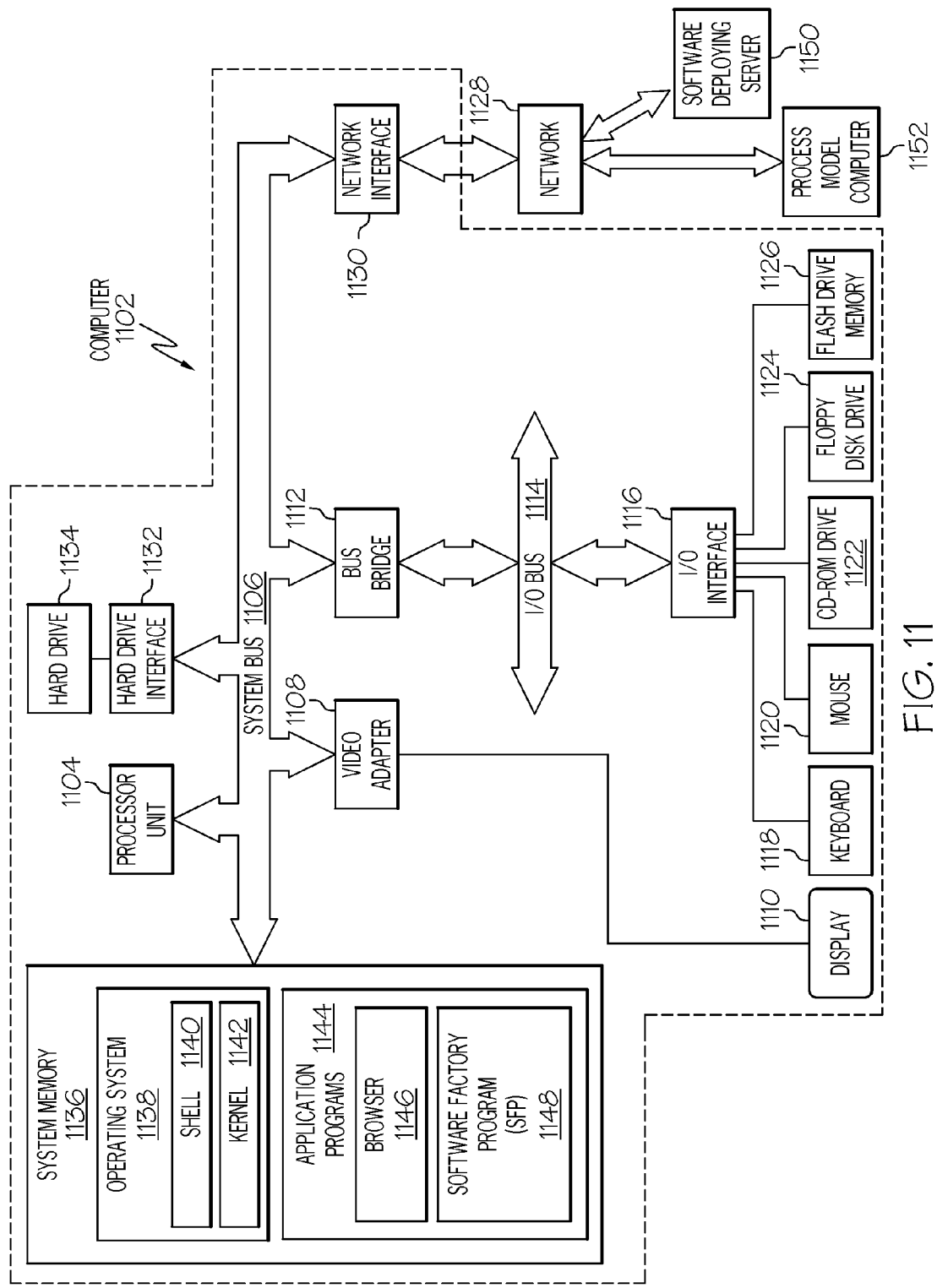
FIG. 11 illustrates an exemplary computer in which the present invention may be utilized.

With reference now to FIG. 11, there is depicted a block diagram of an exemplary computer 1102, in which the present invention may be utilized. Note that some or all of the exemplary architecture shown for computer 1102 may be utilized by software deploying server 1150, as well a process model computer 1152, which implements the process model 102 depicted in FIG. 1. Thus, in one embodiment, the computer 1102 executes the mapping logic 106 and manages the software factory 112 shown in FIG. 1, while the process model computer 1152 creates and manages the process model 102 shown in FIG. 1. In other embodiments, the creation, management, and/or execution of the process model 102, mapping logic 106, and/or software factory 112 is performed in various permutations/combinations by computer 1102 and/or process model computer 1152.

Computer 1102 includes a processor unit 1104 that is coupled to a system bus 1106. A video adapter 1108, which drives/supports a display 1110, is also coupled to system bus 1106. System bus 1106 is coupled via a bus bridge 1112 to an Input/Output (I/O) bus 1114. An I/O interface 1116 is coupled to I/O bus 1114. I/O interface 1116 affords communication with various I/O devices, including a keyboard 1118, a mouse 1120, a Compact Disk-Read Only Memory (CD-ROM) drive 1122, a floppy disk drive 1124, and a flash drive memory 1126. The format of the ports connected to I/O interface 1316 may be any known to those skilled in the art of computer architecture, including but not limited to Universal Serial Bus (USB) ports.

Client computer 1102 is able to communicate with a software deploying server 1150 via a network 1128 using a network interface 1130, which is coupled to system bus 1106. Network interface 1130 may include an Enterprise Service Bus (not shown), such as the ESB discussed above. Network 1128 may be an external network such as the Internet, or an internal network such as an Ethernet or a Virtual Private Network (VPN). Note the software deploying server 1150 may utilize a same or substantially similar architecture as client computer 1102.

A hard drive interface 1132 is also coupled to system bus 1106. Hard drive interface 1132 interfaces with a hard drive 1134. In a preferred embodiment, hard drive 1134 populates a system memory 1136, which is also coupled to system bus 1106. System memory is defined as a lowest level of volatile memory in client computer 1102. This volatile memory includes additional higher levels of volatile memory (not shown), including, but not limited to, cache memory, registers and buffers. Data that populates system memory 1136 includes client computer 1102's operating system (OS) 1138 and application programs 1144.

OS 1138 includes a shell 1140, for providing transparent user access to resources such as application programs 1144. Generally, shell 1140 is a program that provides an interpreter and an interface between the user and the operating system. More specifically, shell 1140 executes commands that are entered into a command line user interface or from a file. Thus, shell 1140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 1142) for processing. Note that while shell 1140 is a text-based, line-oriented user interface, the present invention will equally well support other user interface modes, such as graphical, voice, gestural, etc.

As depicted, OS 1138 also includes kernel 1142, which includes lower levels of functionality for OS 1138, including providing essential services required by other parts of OS 1138 and application programs 1144, including memory management, process and task management, disk management, and mouse and keyboard management.

Application programs 1144 include a renderer, shown in exemplary manner as a browser 1146. Browser 1146 includes program modules and instructions enabling a world wide web (WWW) client (i.e., computer 1102) to send and receive network messages to the Internet using hypertext transfer protocol (HTTP) messaging, thus enabling communication with software deploying server 1150 and other computer systems.

Application programs 1144 in computer 1102's system memory (as well as software deploying server 1150's system memory) also include a software factory program (SFP) 1148. SFP 1148 includes code for implementing the processes described herein, including those described in FIGS. 1-10 and 12. That is, SFP 1148 includes software needed to 1) create/manage a process model such as process model 102 shown in FIG. 1; 2) create/manage mapping logic 106 shown in FIG. 1; and 3) create/manage the software factory 112 shown in FIG. 1. In one embodiment, computer 1102 is able to download SFP 1148 from software deploying server 1150, including in an on-demand basis, wherein the code in SFP 1148 is not downloaded until needed for execution to define and/or implement the improved enterprise architecture described herein. Note further that, in one embodiment of the present invention, software deploying server 1150 performs all of the functions associated with the present invention (including execution of SFP 1148), thus freeing computer 1102 from having to use its own internal computing resources to execute SFP 1148.

The hardware elements depicted in computer 1102 are not intended to be exhaustive, but rather are representative to highlight essential components required by the present invention. For instance, computer 1102 may include alternate memory storage devices such as magnetic cassettes, digital versatile disks (DVDs), Bernoulli cartridges, and the like. These and other variations are intended to be within the spirit and scope of the present invention.

Figure 12:
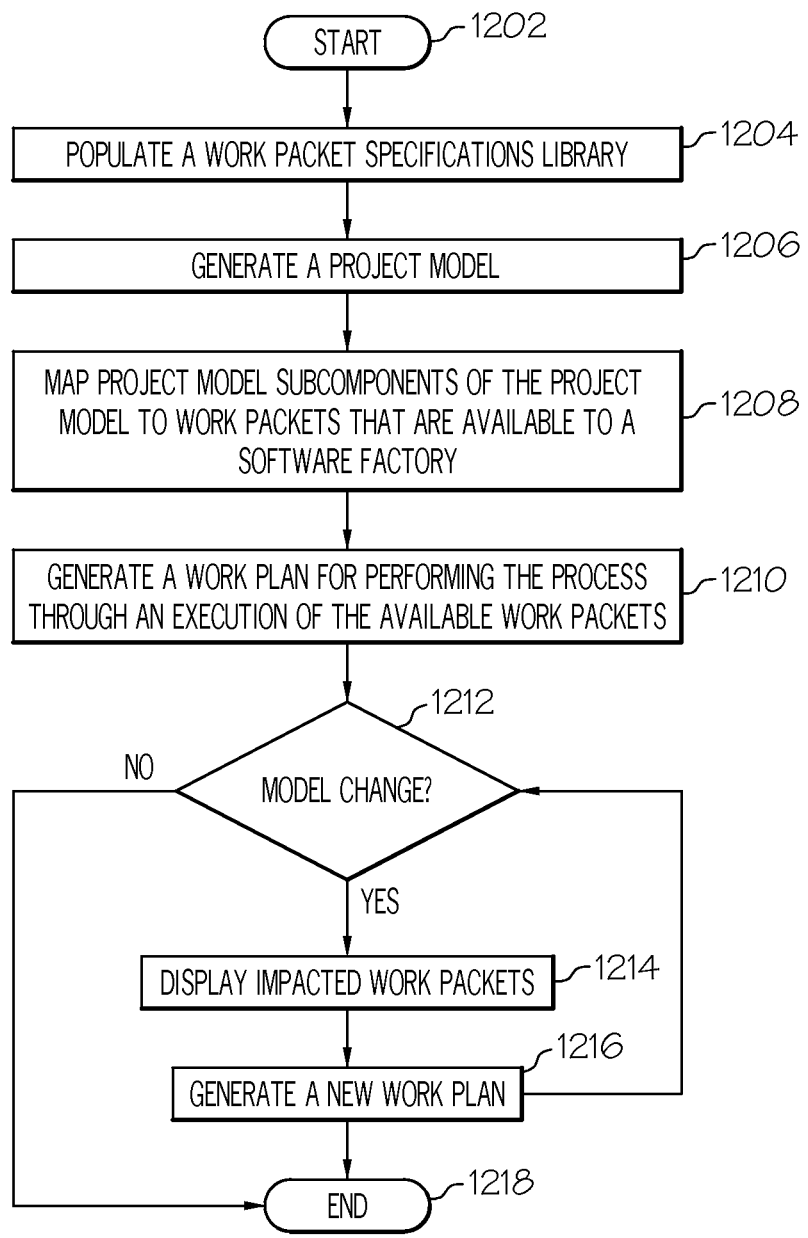
FIG. 12 is a high level flow chart of exemplary steps taken by a processor to assign work to a software factory from a process model.

Referring now to FIG. 12, a high level flow chart of exemplary steps taken by a processor to assign work to a software factory from a project model is presented. After initiator block 1202, a work packet specifications library (e.g., the work packet specifications library 108 shown in FIG. 1) is populated (block 1204) with information about the work packets and the project model subcomponents, as described above. As described in block 1206, the project model is generated. This project model may include both executable and non-executable subcomponents. If the project model includes non-executable subcomponents, then these non-executable subcomponents are converted into executable subcomponents. These converted executable subcomponents may be directly executable (e.g., they are now C++ objects, extensible markup language (XML) objects, etc.) or indirectly executable (e.g., they are now universal markup language (UML) objects).

As described in block 1208, the project model subcomponents are then mapped to work packets that are available to the software factory. A mapped-to work packet is one or more work packets that is/are able to perform the function described for a mapped-from project model subcomponent. A work plan is then generated to perform the process described by the project model (block 1210). This work plan includes the calling and execution of the appropriate work packets found in (or at least available to) the software factory.

As described in query block 1212, if a change occurs to the project model (e.g., a new feature is added, an old feature is removed, a new constraint is added, etc.), then any impacted work packets (i.e., those work packets that are newly called, newly divorced, and/or newly modified for use by the software factory) are displayed (block 1214). This display may be on a user interface presented by a monitor such as display 1110 shown in FIG. 11. As described in block 1216, a new work plan is then generated to direct the software factory in executing the appropriate software packets to perform the task described by the new project model. If there are no more changes to the process model, the method ends at terminator block 1218.

Note that the disclosure presented herein distinguishes between a process definition or description, actual models (e.g., use case models, design models, deployment models, etc.), and deliverables (that are created during execution of the process). As described herein, the actual models and deliverables drive what needs to happen next in the process described by the process definition/description. By mapping the actual models and deliverables against the process and work packet library, a project plan is automatically generated in order to assign the work. Note that a "project model" is not the same as a "process model." That is, a process model describes a methodology used in a process, and does not describe current process states, current deliverables, etc. associated with a current project. Conversely, the project model described herein is of a specific current project state, which consists of the various deliverables (some of which may themselves be models, such as a design model) that have been created and their state(s), and uses that information about the current project state to determine the necessary work packets and assignments needed to execute/implement the current project.

Note also that, in one embodiment, the present disclosure depends on a clearly defined relationship between the process definition, the Project Model, and the work packet library. As used herein, the process definition describes the activities which make up the process. Each activity takes some set of input artifacts in a particular state, and produces a set of deliverables in a particular state. Therefore, an activity can involve the creation of a new deliverable in its initial state, or it can involve changing the state of one of its input artifacts. The work packet library is then created by partitioning the process into sets of activities that can be assigned. The process will have some initial activities which may require some input artifacts; thus, those input artifacts constitute the initial state of the Project Model that gets generated to kick off execution.

As detailed herein in various embodiments, the present disclosure describes a system and method for performing model-driven work assignment in the context of a factory environment for service delivery. The present invention provides the ability to start from a project model and a library of work specifications (called work packets), and assign model elements to be worked on using the right combination of these work packets. The result of this process is a work break-down structure that contains both architecture specific dependencies as well as process related dependencies (as specified by the work packets themselves). These dependencies are "live" such that, as the project model changes, the dependency mapping can indicate which work packets are affected and how.

As described in exemplary embodiments herein, the project model is comprised of a set of model elements. Each model element is characterized by its element type. Each element type in turn defines a set of element states, which describe the relevant lifecycle states for the element, as well as the valid set of relationships that can exist between an element of that type, as well as with other elements in the project model.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of assigning work to a software factory for executing a project, the computer implemented method comprising:
   generating via a processor a project model from a process, wherein the project model is of a current project state that describes executable deliverables and states of the executable deliverables of a current project, wherein the project model is comprised of a set of model elements, wherein each model element is characterized by an element type, wherein each element type defines a set of element states, wherein each element state from the set of element states describes lifecycle states for a particular model element of the project model, and wherein each element state from the set of elements states describes a set of relationships that exist between the particular model element and other model elements in the project model;
   mapping via the processor project model subcomponents of the project model to work packets that are available in a software factory, wherein each of said work packets comprises a header, wherein the header comprises a unique identification number, a description of said each of said work packets, a type description of said each of said work packets, an identifier of a parent object from which said each of said work packets has inheritance, and a checklist for returning said each of said work packets to the software factory after a customized deliverable unit of software has been delivered by the software factory;
   determining via the processor which available work packets in the software factory are necessary work packets for executing the current project, wherein the determining is based on which work assignments are necessary for executing the current project;
   generating via the processor an initial work plan for executing the project via an execution of the available work packets: and
   in response to detecting changes to the project model, the processor displaying impacted work packets, wherein the changes to the project model comprise a new feature being added, an old feature being removed, and a new constraint being removed from the project model, and wherein the impacted work packets comprise work packets that are newly called, newly divorced, and newly modified for use by the software factory.

2. The computer implemented method of claim 1, wherein the project model comprises both executable and non-executable subcomponents.

3. The computer implemented method of claim 2, further comprising:
   the processor converting the non-executable subcomponents into executable subcomponents before mapping the project model subcomponents to the work packets.

4. The computer implemented method of claim 1, further comprising:
   the processor, in response to detecting a change to the project model, generating a new work plan.

5. The computer implemented method of claim 1, wherein the software factory comprises:
   a software factory governance section that evaluates a project proposal for acceptance by the software factory; and
   an assembly line and job shop that receive and execute the available work packets to create deliverable software.

6. The computer implemented method of claim 5, wherein the assembly line and job shop further comprise:
   a published set of services and a published set of requirements for the assembly line and job shop, wherein the published set of services and the published set of requirements for the assembly line and job shop are published to a design center, and wherein the published set of services describes what assembly services for assembling work packets are offered by the assembly line and job shop, and wherein the published set of requirements describes what execution environment must be used by work packets that are provided by the design center for assembly in the assembly line and job shop.

7. The computer implemented method of claim 6, wherein the work packets include governance procedures, standards, reused assets, work packet instructions, integration strategy, schedules, exit criteria and artifact checklist templates for Input/Output routines.

8. The computer implemented method of claim 7, wherein the assembly line and job shop includes software that automatically recognizes a project type for a project proposal, and wherein the assembly line and job shop assemble the work packets into the deliverable software in accordance with the project type that is recognized by the assembly line and job shop.

9. The computer implemented method of claim 8, wherein the assembly line and job shop conduct an integration test, a system test, a system integration test and a performance test of the deliverable software, wherein the integration test tests the deliverable software for compatibility with a client's system, the system test checks the client's system to ensure that the client's system is operating properly, the system integration test tests for bugs that may arise when the deliverable software is integrated into the client's system, and the performance test tests the deliverable software for defects as it is executing in the client's system.

10. A computer program product for assigning work to a software factory for executing a project, the computer program product comprising: a non-transitory computer readable storage media; first program instructions to generate a project model from a process, wherein the project model is of a current project state that describes executable deliverables and states of the executable deliverables of a current project;
   second program instructions to map project model subcomponents of the project model to work packets that are available in a software factory, wherein each of said work packets comprises a header, wherein the header comprises a unique identification number, a description of said each of said work packets, a type description of said each of said work packets, an identifier of a parent object from which said each of said work packets has inheritance, and a checklist for returning said each of said work packets to the software factory after a customized deliverable unit of software has been delivered by the software factory;
   third program instructions to determine which available work packets in the software factory are necessary work packets for executing the current project, wherein the determining is based on which work assignments are necessary for executing the current project;
   fourth program instructions to generate an initial work plan for executing the project via an execution of the available work packets; and
   fifth program instructions to, in response to detecting changes to the project model, display impacted work packets, wherein the changes to the project model comprise a new feature being added to the project model, an old feature being removed from the project model, and a new constraint being removed from the project model, and wherein the impacted work packets comprise work packets that are newly called, newly divorced, and newly modified for use by the software factory; and wherein
   the first, second, third, fourth, and fifth program instructions are stored on the non-transitory computer readable storage media and executed by the processor via the computer readable memory.

11. The computer program product of claim 10, wherein the project model comprises both executable and non-executable subcomponents.

12. The computer program product of claim 10, further comprising:
   sixth program instructions to convert the non-executable subcomponents into executable subcomponents before mapping the project model subcomponents to the work packets; and wherein the sixth program instructions are stored on the non-transitory computer readable storage media and executed by the processor via the computer readable memory.

13. The computer program product of claim 10, further comprising:
   [sixth program instructions to, in response to detecting a change to the project model, generate a new work plan that uses different work packets than those used by the initial work plan; and wherein the sixth program instructions are stored on the non-transitory computer readable storage media and executed by the processor via the computer readable memory.

14. A computer system comprising:
   a processor, a computer readable memory, and a computer readable storage media; first program instructions to generate a project model from a process, wherein the project model is of a current project state that describes executable deliverables and states of the executable deliverables of a current project;
   second program instructions to map project model subcomponents of the project model to work packets that are available in a software factory, wherein each of said work packets comprises a header, wherein the header comprises a unique identification number, a description of said each of said work packets, a type description of said each of said work packets, an identifier of a parent object from which said each of said work packets has inheritance, and a checklist for returning said each of said work packets to the software factory after a customized deliverable unit of software has been delivered by the software factory;
   third program instructions to determine which available work packets in the software factory are necessary work packets for executing the current project, wherein the determining is based on which work assignments are necessary for executing the current project;
   fourth program instructions to generate an initial work plan for executing the project via an execution of the available work packets; and
   fifth program instructions to, in response to detecting changes to the project model, display impacted work packets, wherein the changes to the project model comprise a new feature being added to the project model, an old feature being removed from the project model, and a new constraint being removed from the project model, and wherein the impacted work packets comprise work packets that are newly called, newly divorced, and newly modified for use by the software factory; and wherein
   the first, second, third, fourth, and fifth program instructions are stored on the non-transitory computer readable storage media and executed by the processor via the computer readable memory.

15. The computer system of claim 14, wherein the project model comprises both executable and non-executable subcomponents.

16. The computer system of claim 15, further comprising:
   sixth program instructions to convert the non-executable subcomponents into executable subcomponents before mapping the project model subcomponents to the work packets; and wherein the sixth program instructions are stored on the computer readable storage media and executed by the processor via the computer readable memory.

17. The computer system of claim 14, further comprising:
   sixth program instructions to, in response to detecting a change to the project model, generate a new work plan that uses different work packets than those used by the initial work plan; and wherein the sixth program instructions are stored on the computer readable storage media and executed by the processor via the computer readable memory.

* * * * *